(12) United States Patent
Okamura et al.

(10) Patent No.: US 8,472,097 B2
(45) Date of Patent: Jun. 25, 2013

(54) OPTICAL SCANNING APPARATUS AND IMAGE FORMING APPARATUS PROVIDED WITH THE SAME

(75) Inventors: Hideki Okamura, Osaka (JP); Aiichiro Otana, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 231 days.

(21) Appl. No.: 13/030,545

(22) Filed: Feb. 18, 2011

(65) Prior Publication Data

US 2011/0205610 A1    Aug. 25, 2011

(30) Foreign Application Priority Data

Feb. 24, 2010 (JP) .................. 2010-038500
Mar. 19, 2010 (JP) .................. 2010-063560
Feb. 10, 2011 (JP) .................. 2011-027111

(51) Int. Cl.
   *G02B 26/08*    (2006.01)
(52) U.S. Cl.
   USPC ....................................... 359/201.2
(58) Field of Classification Search
   USPC ............... 359/204.1, 205.1, 212.1; 347/243
   See application file for complete search history.

(56) References Cited

U.S. PATENT DOCUMENTS

2006/0139715 A1 * 6/2006 Tamaru et al. ............ 359/204
2009/0324293 A1   12/2009 Tomioka

FOREIGN PATENT DOCUMENTS

JP    2002-148542    5/2002

OTHER PUBLICATIONS

The extended Europan Search Report issued to EP Application No. 11154701.4, mailed Apr. 27, 2011.

* cited by examiner

Primary Examiner — Euncha Cherry
(74) Attorney, Agent, or Firm — Dilworth & Barrese, LLP

(57) ABSTRACT

The present invention is an optical scanning apparatus provided with a light source, an optical deflector that reflects and deflects a light beam from the light source, one or more lenses through which the light beam reflected by the optical deflector passes, a reflective mirror group which guides the light beam having passed through the lens, and an image bearing member on which the light beam having passed through the reflective mirror group forms an image, in which the reflective mirror group disposed in accordance with the light source is configured by including at least a third reflective mirror that reflects the light beam having passed through the lens toward the image bearing member, and the third reflective mirror and the image bearing member are arranged opposing each other across an optical path reflected by the optical deflector and passing through the lens.

17 Claims, 25 Drawing Sheets

FIG. 11

| | |
|---|---|
| INCIDENT ANGLE TO POLYGON | MAJOR DIRECTION: 70[deg] |
| POLYGON SHAPE | INSCRIBED 25.98[mm] HEXAHEDRON |
| APERTURE SHAPE | 3.3 × 1.0[mm] OVAL |
| WAVELENGTH·TEMPERATURE | 780[nm] 25[°C] |
| EYE RELEIF | 15[mm] |
| POLYGON OFFSET | -1.15[mm] |
| LENS OFFSET | 0[mm] |
| FOCAL DISTANCE | 155[mm] |
| MAXIMUM IMAGE HEIGHT | 108[mm] |

SCANNING LIGHT LENS SPECIFICATION (2-GROUP 2-LENS)

| SURFACE NUMBER | MAIN SCANNING DIRECTION RADIUS OF CURVATURE($r_m$) | SUB SCANNING DIRECTION RADIUS OF CURVATURE($r_{s0}$) | FACE INTERVAL | REFRACTION INDEX | GRADE | SURFACE SHAPE |
|---|---|---|---|---|---|---|
| 1 | -22.781 | -8.000 | 7.00 | 1.507595 | Z-330R | FREE-FORM CURVED SURFACE |
| 2 | -16.978 | 23.409 | 23.50 | | | FREE-FORM CURVED SURFACE |
| 3 | -73.771 | 49.349 | 4.50 | 1.507595 | Z-330R | FREE-FORM CURVED SURFACE |
| 4 | -256.546 | -19.106 | 130.00 | | | CYLINDRICAL SURFACE |

CYLINDRICAL LENS SPECIFICATION

| SURFACE NUMBER | MAIN SCANNING DIRECTION RADIUS OF CURVATURE | SUB SCANNING DIRECTION RADIUS OF CURVATURE | FACE INTERVAL | REFRACTION INDEX | GLASS TYPE |
|---|---|---|---|---|---|
| 1 | ∞ | 17.795 | 3.00 | 1.485 | PMMA |
| 2 | ∞ | ∞ | 34.58 | | |

ASPHERIC FACTOR AND CONIC CONSTANT OF SCANNING LIGHT LENS

| SURFACE NUMBER | A3 | A4 | A5 | A6 | A8 | A10 | $K_m$ |
|---|---|---|---|---|---|---|---|
| 1 | 0 | 2.00E-05 | 0 | 0 | 0 | 0 | 0 |
| 2 | 0 | 1.34E-05 | 0 | 2.54E-08 | 0 | 0 | -0.4709 |
| 3 | 0 | 6.14E-06 | 0 | -3.24E-09 | 7.11E-13 | 4.38E-16 | 2.4349 |
| 4 | 0 | -1.31E-06 | 0 | 9.80E-10 | -1.12E-12 | 4.91E-16 | 39.8027 |

| SURFACE NUMBER | B1 | B2 | B3 | B4 | B6 | B8 | B10 |
|---|---|---|---|---|---|---|---|
| 1 | 0 | 2.44E-02 | -2.98E-04 | -1.00E-04 | 0 | 0 | 0 |
| 2 | 2.51E-01 | -5.49E-03 | -8.13E-04 | 6.05E-05 | 0 | 0 | 0 |
| 3 | 8.19E-02 | -2.16E-03 | 4.08E-05 | 4.28E-06 | 0 | 0 | 0 |
| 4 | 1.46E-03 | -6.33E-03 | 9.27E-03 | 2.53E-06 | 0 | 0 | 0 |

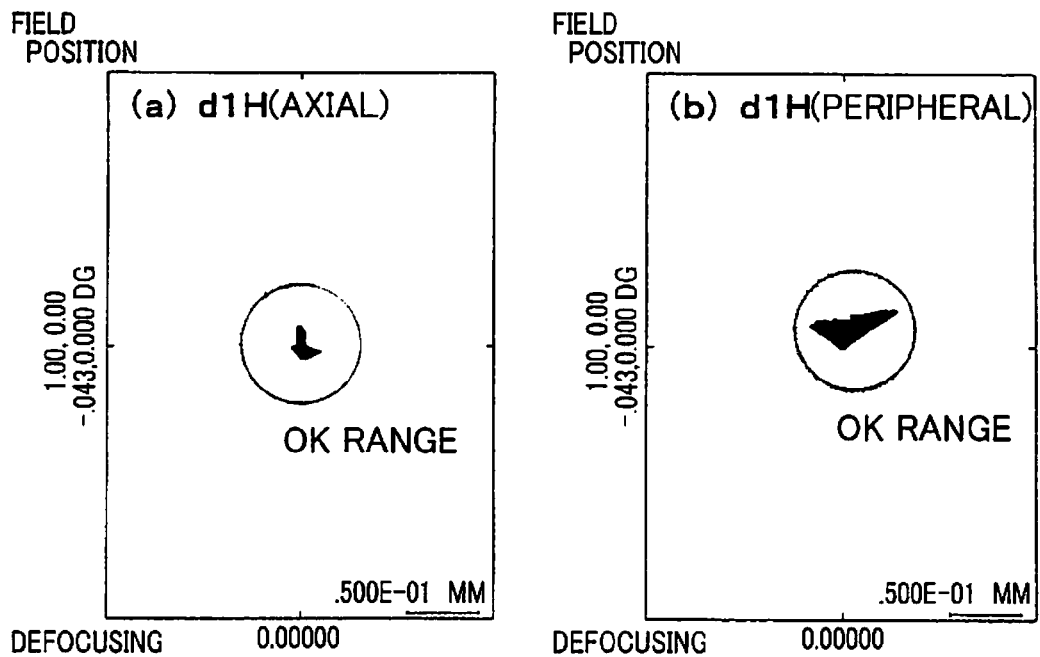
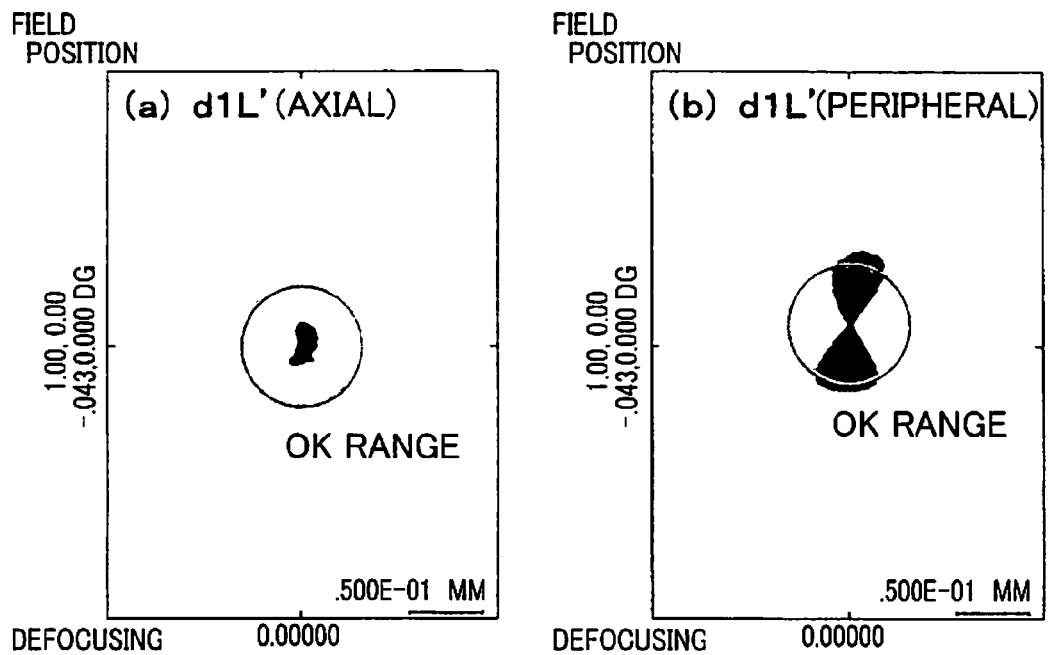

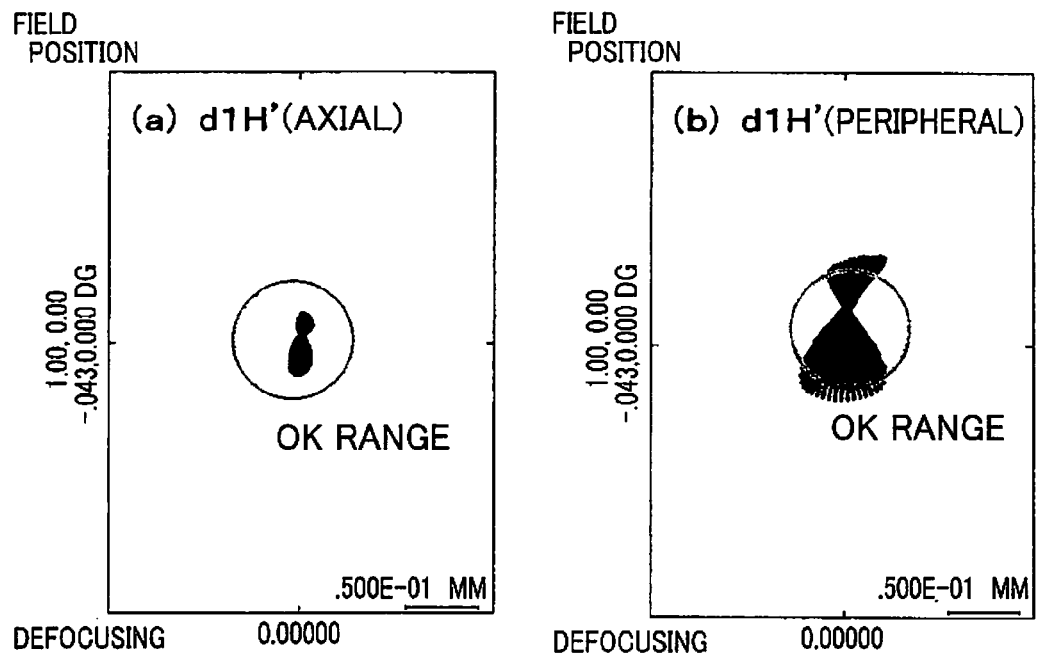
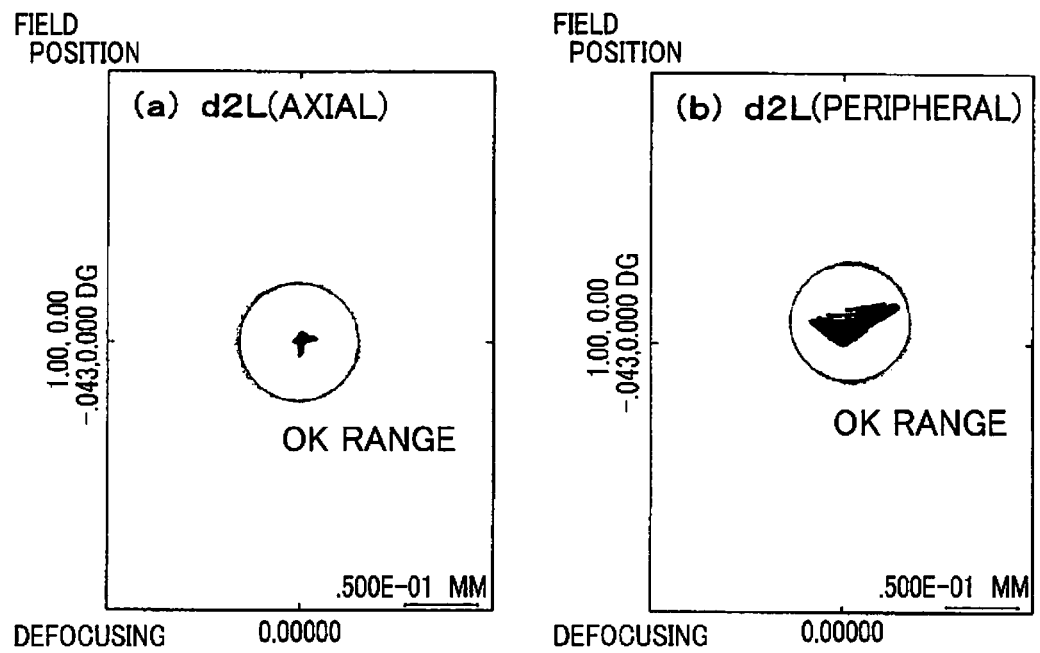

OPTICAL SCANNING APPARATUS AND IMAGE FORMING APPARATUS PROVIDED WITH THE SAME

This application is based upon and claims the benefit of priority from Japanese Patent Application Nos. 2010-038500, 2010-063560 and 2011-027111, respectively filed on 24 Feb. 2010, 19 Mar. 2010 and 10 Feb. 2011, the contents of which are incorporated herein by reference.

BACKGROUND OF THE INVENTION

1. Field of the Invention

The present invention relates to an image forming apparatus such as a copier, a printer, a facsimile machine and the like, and an optical scanning apparatus used in the image forming apparatus.

2. Related Art

Hitherto, a tandem-type color image forming apparatus that performs latent image writing, which is formation of an image on an image bearing member such as a drum by a light beam, separately by optical scanning apparatuses provided respectively for image bearing members is known. In such an optical scanning apparatus, optical deflectors such as polygon mirrors and motors for driving them are needed in a number of light sources. However, an optical scanning apparatus using such an optical deflector is relatively expensive. Thus, to individually dispose an optical scanning apparatus at each image bearing member causes a problem of a component cost and a manufacturing cost.

Thus, in order to reduce costs and the size of a tandem-type color image forming apparatus, such an image forming apparatus is known that as means for performing optical scanning for a plurality of image bearing members, an optical deflector is made common, and light beams from a plurality of light sources are simultaneously deflected and scanned by one optical deflector so that the light beams from the plurality of light sources are simultaneous radiated to a plurality of image bearing members by one optical deflector, and optical scanning is performed.

For example, an optical scanning apparatus in FIG. 6 is provided with a plurality of (four) scanning optical systems. Each of the plurality of (four) scanning optical systems is provided with a plurality of light sources (not shown), an optical deflector 62 that reflects light beams from the plurality of light sources in two symmetrical directions and deflects them, a first image-forming lens 63 disposed in a reflection direction of the optical deflector 62 and through which the light beam reflected by the optical deflector 62 passes, mirror groups 65, 75, and 76 that guide the light beam having passed through the image-forming lens 63, a photoreceptor drum 2 on which the light beam having passed through the mirror groups 65, 75, and 76 forms an image, and a second image-forming lens 70.

In such an optical scanning apparatus, if a distance from the light source to the first image-forming lens 63 and a focal distance of the first image-forming lens 63 are determined, an optical path length from the first image-forming lens 63 to the photoreceptor drum 2 becomes constant. Thus, if size reduction of the apparatus is to be realized by arranging the photoreceptor drum 2 close to the optical deflector 62, the optical path needs to be folded back.

Thus, in the optical scanning apparatus shown in FIG. 6, the mirror groups 65, 75, and 76 are arranged between the first image-forming lens 63 and the photoreceptor drum 2, whereby size reduction of the device is promoted by folding back the optical path.

SUMMARY OF THE INVENTION

However, in the optical scanning apparatus, a horizontal layer provided with the optical deflector 62 and the first image-forming lens 63, a horizontal layer of the folded-back optical path provided with the mirrors 75 and 76, and the photoreceptor drum 2 are arranged vertically in this order. Thus, a distance from the optical deflector 62 to the image bearing member 2 increases. As a result, the size of the entire optical scanning apparatus in the vertical direction increases.

Therefore, the present invention was made in view of the above circumstances and has an object to provide an optical scanning apparatus in which size reduction of the entire optical scanning apparatus can be promoted by changing arrangement of a mirror that reflects light to an image bearing member, the image bearing member and an optical deflector, and an image forming apparatus provided with the same.

The present invention is an optical scanning apparatus provided with a light source, an optical deflector that reflects and deflects a light beam from the light source, one or more lenses installed in a reflection direction of the optical deflector and through which the light beam reflected by the optical deflector passes, a reflective mirror group which is disposed in accordance with the light source and guides the light beam having passed through the lens, and an image bearing member on which the light beam having been emitted from the light source and having passed through the reflective mirror group forms an image, in which the reflective mirror group is configured by including at least a third reflective mirror that reflects the light beam having passed through the lens toward the image bearing member, and the third reflective mirror and the image bearing member are arranged opposing each other across an optical path reflected by the optical deflector and passing through the lens.

Also, the present invention is an optical scanning apparatus provided with a plurality of light sources, an optical deflector that reflects light beams from the plurality of light sources in two symmetrical directions and deflects the same, one or more lenses installed in a reflection direction of the optical deflector and through which the light beams reflected by the optical deflector pass, a reflective mirror group that is disposed in accordance with the light source and guides the light beams having passed through the lens, and a plurality of image bearing members on which the light beams having been emitted from the plurality of light sources and having passed through the reflective mirror group form images, in which the reflective mirror group is provided with at least a third reflective mirror that reflects the light beam having passed through the lens toward the image bearing member, and the third reflective mirror and the image bearing member are arranged opposing each other across an optical path reflected by the optical deflector and passing through the lens.

As for arrangement of a reflective mirror layer, an optical scanner layer, and a photoreceptor drum, the reflective mirror layer, the optical scanner layer, and the photoreceptor drum are aligned vertically in this order.

Thus, if the position of the last reflective mirror is fixed by fixing a distance between the last reflective mirror and the photoreceptor drum, a vertical distance between the optical scanner and the photoreceptor drum can be reduced by a portion of twice of the distance in the vertical direction between the optical scanner layer and the last reflective mirror.

Also, the one or more lenses are two fθ lenses, and the positions of the two fθ lenses and the third reflective mirror are preferably set so that the light beam from the third reflective mirror to the image bearing member passes between the two fθ lenses. By employing such arrangement, the optical scanning apparatus can be made more compact.

Also, the reflective mirror group is preferably provided with a second reflective mirror that reflects the light beam to the third reflective mirror and a first reflective mirror that reflects the light having passed through the two fθ lenses toward the second reflective mirror. In this case, if reflection angles of the first reflective mirror and the second reflective mirror are both 90 degrees, the size of the mirror group can be reduced and also, angles of the mirrors can be set accurately. Thus, working accuracy can be improved.

Also, an optical scanning apparatus of the present invention is an optical scanning apparatus provided with a board having a scanning direction hole, a light source which is arranged on one surface side of the board and emits a light beam partially containing image information, an optical deflector which is disposed on the one surface side where the light source of the board is disposed and deflects the light beam from the light source in a predetermined angular range and performs scanning, an optical system that guides the light beam deflected to be used scanning by the optical deflector to an other surface side of the board through the scanning direction hole, and a scan start position region detection portion which is disposed on the other surface side of the board and detects a scan start position detection region by detecting a region excluding an image region, which is a region containing the image information in the light beam guided to the other surface side of the board through the scanning direction hole, in which a portion, which is a part of the scanning direction hole and through which the light beam of the image region passes, and a portion, which is a part of the scanning direction hole and through which the light beam of the scan start position detection region passes, are formed separately by a separation wall forming a part of the board.

In the present invention, the scanning direction hole corresponding to a opening is formed separately by the separation wall forming a part of the board. That is, the scanning direction hole is connected by the separation wall in the middle thereof. Thus, the separation wall ensures strength of the board. Therefore, as compared with a case in which the scanning direction hole is a single continuous hole, the strength of the board is sufficiently ensured.

Also, an optical path of the light beam deflected to be used for scanning by the optical deflector is preferably folded back from the surface side on which the light source of the board is arranged to the side opposite to the surface side on which the light source is arranged through a portion of the scanning direction hole through which the light beam of the region containing the image information passes and moreover, folded back to the surface side on which the light source is arranged from the side opposite to the surface side on which the light source of the board is arranged.

In the present invention, as for the arrangement composed of the reflective mirror layer, the optical scanner layer, and the photoreceptor drum, the reflective mirror layer, the optical scanner layer, and the photoreceptor drum are aligned vertically in this order. Thus, if the position of the last reflective mirror is fixed by fixing the distance between the last reflective mirror and the photoreceptor drum, a vertical distance between the optical scanner and the photoreceptor drum can be reduced by the portion of twice of the distance in the vertical direction between the optical scanner layer and the last reflective mirror.

As a result, the vertical size of this optical scanning apparatus can be reduced.

Also, according to the present invention, since the strength of the board can be sufficiently ensured, the board is resistant not only against deformation caused by an external force or an internal stress but also against vibration by a vibration generating source such as a polygon motor. As a result, a jitter image is prevented from being generated and hence, an image quality can be improved.

BRIEF DESCRIPTION OF THE DRAWINGS

FIG. 11 is a diagram illustrating an example of execution conditions of the optical scanning apparatus Y;

FIG. 23 are spot diagrams of the scanning light when the first power condition in the main scanning direction of the scanning light lens in the optical scanning apparatus Y is changed;

FIG. 24 are spot diagrams of the scanning light when the first power condition in the main scanning direction of the scanning light lens in the optical scanning apparatus Y is changed;

FIG. 25 are spot diagrams of the scanning light when the first power condition in the main scanning direction of the scanning light lens in the optical scanning apparatus Y is changed;

FIG. 26 are spot diagrams of the scanning light when the second power condition in the main scanning direction of the scanning light lens in the optical scanning apparatus Y is changed;

DETAILED DESCRIPTION OF THE INVENTION

Embodiments of the present invention will be described below referring to the attached drawings. The following embodiments are one example that embodies the present invention and does not limit the technical range of the present invention.

First, an outline of an image forming apparatus X according to a first embodiment of the present invention will be explained. The image forming apparatus X will be described using a color printer as an example, but is not limited thereto. The image forming apparatus X may be a copier, a facsimile machine, a monochromic printer and the like.

Figure 1:
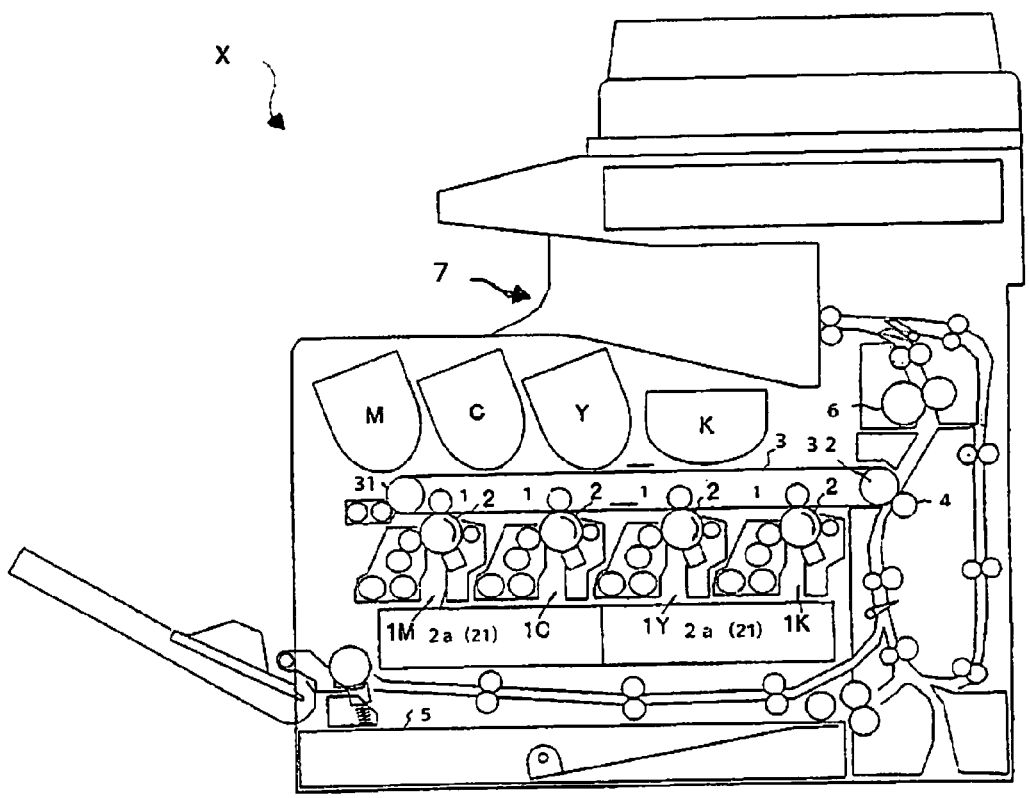
FIG. 1 is a side sectional view illustrating an entire configuration of an image forming apparatus according to a first embodiment of the present invention.
Figure 2:
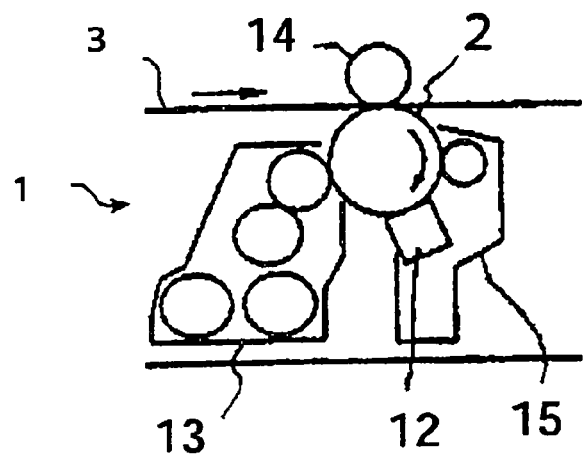
FIG. 2 is a sectional view illustrating a configuration of an image forming portion of the image forming apparatus according to the first embodiment of the present invention.
Figure 3:
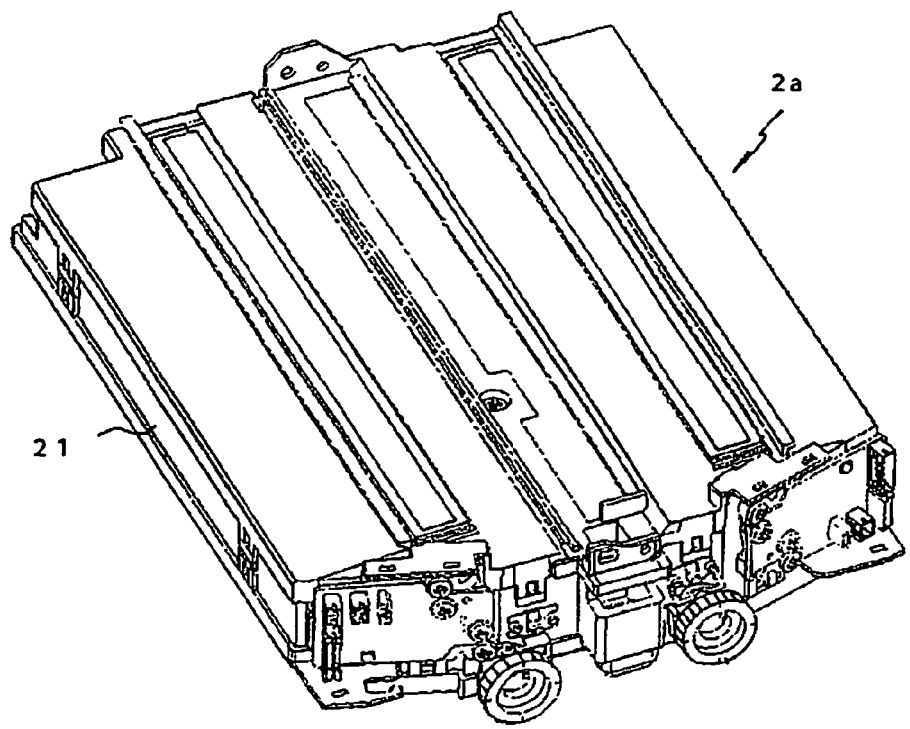
FIG. 3 is a perspective view illustrating an appearance of a scanning optical unit used in the image forming apparatus according to the first embodiment of the present invention.

The image forming apparatus X is provided with, as shown in FIGS. 1 and 2, four image forming portions 1, two optical devices 2a, and an intermediate transfer belt 3 similarly to a general intermediate transfer type image forming apparatus. Moreover, the image forming apparatus X is provided with a secondary transfer device 4, a paper feeding device 5, a fixing device 6, a paper discharge portion 7 and the like.

Here, each of the four image forming portions 1 performs an image forming process of transferring a toner image in each color of black, yellow, cyan, and magenta to the intermediate transfer belt 3. The image forming portion 1 performs the image forming process from the right side in FIG. 1 (downstream side in the moving direction of the intermediate transfer belt 3) in the order of black, yellow, cyan, and magenta. These image forming portions 1 do not have different image forming processes for each color but have the same configurations, respectively. Thus, they are collectively referred to as the image forming portions 1. In this embodiment, only if particularly necessary, they are referred to as image forming portions 1B (black), 1Y (yellow), 1C (cyan), and 1M (magenta). Also, the two optical devices 2a both have the same configurations. Thus, they are collectively referred to as the optical devices 2a.

The image forming portion 1 is provided with a photoreceptor drum 2 (an embodiment of an image bearing member), a charging device 12, a developing device 13, a primary transfer device 14, a cleaning device 15 and the like. The photoreceptor drum 2 carries a toner image. The charging device 12 charges the surface of the photoreceptor drum 2. The developing device 13 develops an electrostatic latent image written by irradiating (exposing) laser beam light on the surface of the charged photoreceptor drum 2 by a toner.

The primary transfer device 14 transfers the toner image developed and formed on the photoreceptor drum 2 to the intermediate transfer belt 3. The cleaning device 15 removes the toner remaining on the photoreceptor drum 2. In the case of explanation as a configuration of the image forming portion 1 of a particular color, B, Y, C, or M representing black, yellow, cyan, and magenta, respectively, are added to each character (such that the photoreceptor drum for black is referred to as a photoreceptor drum 2B, for example) similarly to the above-described image forming portions 1B, 1Y, 1C, or 1M.

The two optical devices 2a are arranged below the image forming portion 1. One of the two optical devices 2a is to output laser beam light L (an example of light beam) for forming (writing) an electrostatic latent image on the photoreceptor drum 2 for black and yellow (hereinafter referred to as "for electrostatic latent image formation"). The other of the two optical devices 2a is to output the laser beam light L for electrostatic latent image formation on the photoreceptor drum 2 for cyan and magenta. A configuration of the optical device 2a will be described later. As for the configuration of the optical device 2a, too, in the case of indication of a configuration relating to a particular color, B, Y, C, or M representing black, yellow, cyan, or magenta is added to each character similarly to the image forming portion 1.

The intermediate transfer belt 3 is an endless belt made of a material such as rubber, urethane and the like. The intermediate transfer belt 3 is extended between a driving roller 31 and a driven roller 32 and supported so as to be rotated and driven. The intermediate transfer belt 3 passes between the photoreceptor drum 2 and the primary transfer device 14.

An image forming operation by the image forming apparatus X to a transferred material such as recording paper is not different from the general image forming apparatus X. An outline of the image forming operation by the image forming apparatus X is as follows: First, the photoreceptor drum 2 is uniformly charged by the charging device 12. To the charged photoreceptor drum 2, the laser beam light L is radiated by the optical device 2a. As a result, the photoreceptor drum 2 is exposed, and an electrostatic latent image is formed (written) on the surface of the photoreceptor drum 2. This electrostatic latent image is developed by the developing device 13. Then, a toner image is formed on the surface of the photoreceptor drum 2. This operation is performed in the image forming portion 1 for each color.

The toner image formed on the surface of the photoreceptor drum 2 of each color is sequentially transferred and laminated on the intermediate transfer belt 3 by the corresponding primary transfer device 14. Then, on the intermediate transfer belt 3, a full-color toner image is formed. The full-color toner image formed on the intermediate transfer belt 3 is transferred by the secondary transfer device 4 onto the recording paper fed one by one from the paper feeding device 5. After that, the toner is fixed by the fixing device 6 on the recording paper. The recording paper on which the image is formed is discharged to the paper discharge portion 7.

After the toner image has been transferred to the intermediate transfer belt 3, the toner remaining on the surface of the photoreceptor drum 2 is removed by the cleaning device 15.

As described above, the image forming apparatus X forms a color image on the transferred material such as recording paper.

Subsequently, the optical device 2a of the image forming apparatus X according to the present invention will be described referring to FIGS. 4 and 5.

The optical device 2a is provided with a light source (not shown) such as a laser diode that emits the laser beam light L (See FIG. 5) for the electrostatic latent image formation, an optical system 20 composed of various optical devices for scanning the laser beam light L in the rotational axis direction (main scanning direction) of the photoreceptor drum 2, a housing (not shown) that contains the optical system 20 and the like. The optical devices constituting the optical system 20 include a collimator lens (not shown), a cylindrical lens (not shown), an optical deflector 22, an fθ lens 23, reflective mirrors 24a (an example of a first reflective mirror), 24b (an example of a second reflective mirror), 24c (an example of a third reflective mirror) and the like. The collimator lens (not shown) collimates the laser beam light L emitted by the light source. The cylindrical lens (not shown) focuses the parallel light linearly. The optical deflector 22 is provided with a polygon mirror 22a that rotates and scans the laser beam light in a fan shape while reflecting the laser beam light and its rotation driving motor 22b. The fθ lens 23 is composed of a first fθ lens 23a and a second fθ lens 23b and makes a scanning speed in the main scanning direction of the laser beam light L scanned in the fan shape constant. The reflective mirrors 24a, 24b, and 24c reflect the laser beam light L to be scanned.

The optical devices constituting the optical system 20 are contained in the housing (not shown). The light source may be contained in the housing but not limited thereto, and it may be contained in a holding member or the like exclusively for the light source attached to the outer face of the housing.

The optical device 2a of this embodiment is provided with an optical system that makes the two photoreceptor drums 2 scan the laser beam light L with the above one optical deflector 22. However, in actuality, as shown in FIG. 1, four optical systems are disposed in accordance with the four colors.

However, the optical device in the image forming apparatus in the present invention is not limited thereto, but it may be an optical device that has four photoreceptor drums scan the laser beam light with the one optical deflector or may be an optical device disposed each for the toner colors and provided with an optical deflector for each of the optical devices.

Figure 4:
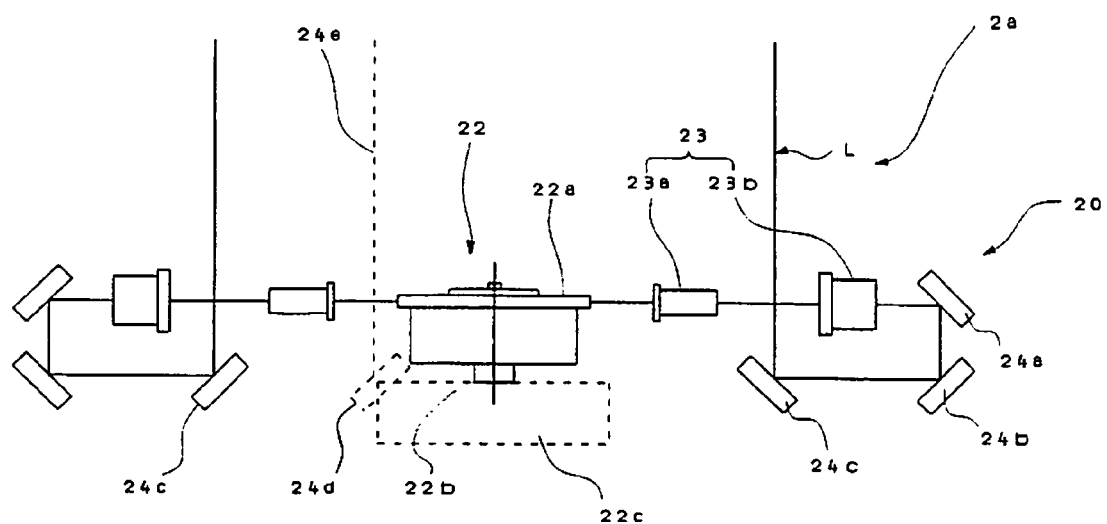
FIG. 4 is an outline sectional view of the scanning optical unit used in the image forming apparatus according to the first embodiment of the present invention.
Figure 5:
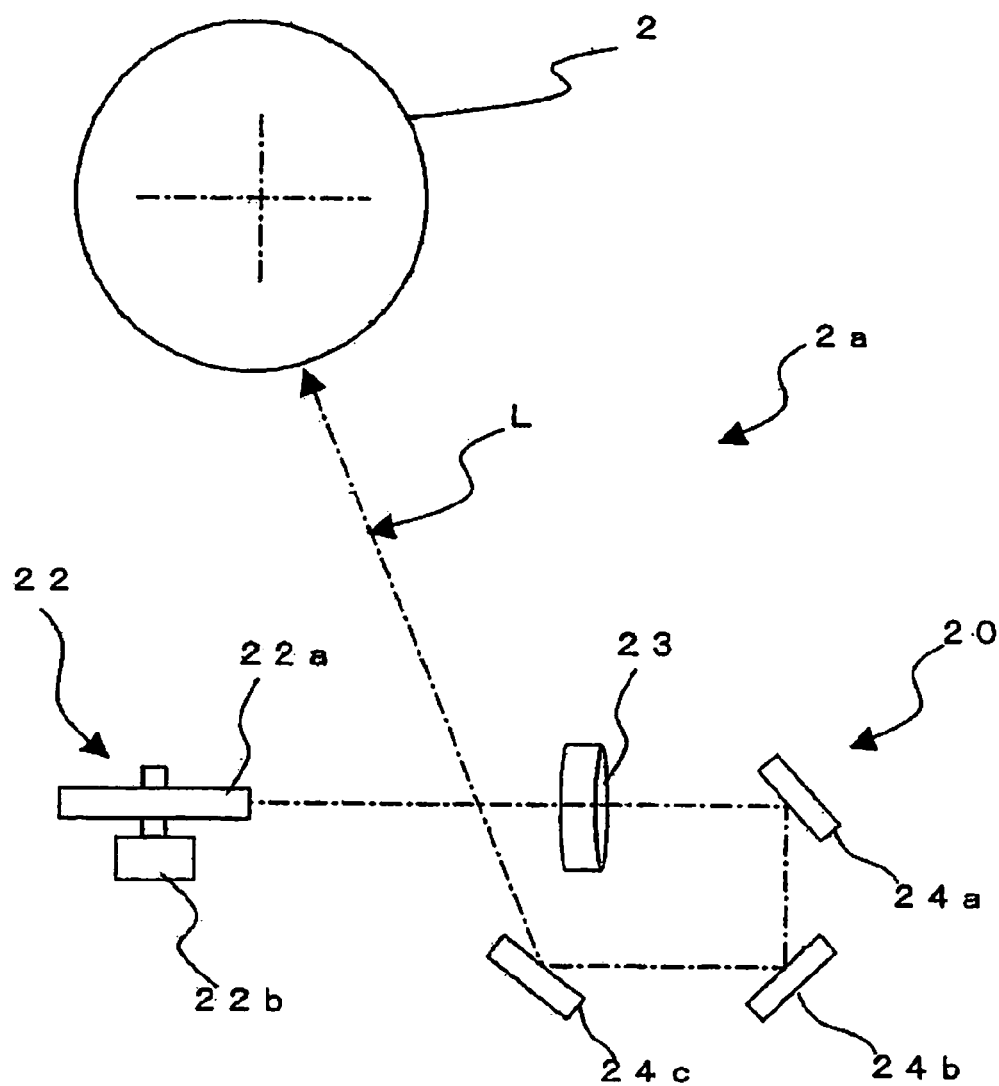
FIG. 5 is an outline sectional view of an optical path written in the scanning optical unit used in the image forming apparatus according to the first embodiment of the present invention.

A characteristic point in the optical scanning apparatus Y according to this embodiment is that, as shown in FIGS. 4 and 5, the first reflective mirror 24a folds back and reflects the light beam (beam light) toward the second reflective mirror 24b below that, the second reflective mirror 24b further reflects the light beam toward the third reflective mirror 24c, and the third reflective mirror 24c further reflects the light beam toward the photoreceptor drum 2 (an example of an image bearing member) above that. Moreover, the characteristic point in the optical scanning apparatus Y according to this embodiment is that reflected light from the third reflective mirror 24c passes between the first fθ lens 23a and the second fθ lens 23b constituting the fθ lens 23, which are divided into two lenses, and is radiated to the photoreceptor drum 2.

In other words, the optical scanning apparatus Y according to this embodiment is provided with an optical deflector layer S1 (See FIG. 7B) provided with the optical deflector 22, the fθ lens 23, which is an example of a collecting lens, and a first reflective mirror 24a as well as a reflective mirror layer S2 provided with the second reflective mirror 24b and the third reflective mirror 24c, which is a layer below the layer S1. The reflective mirror layer S2 (See FIG. 7B) and the photoreceptor drum 2 are arranged opposing each other across the optical deflector layer S1. Moreover, the reflected light from the third reflective mirror 24c passes between the first fθ lens 23a and the second fθ lens 23b constituting the fθ lens 23, which are divided into two lenses, and is radiated to the photoreceptor drum 2.

When this is further simplified, the first characteristic is that, in the optical scanning apparatus Y according to this embodiment, the reflective mirror group 24 disposed in accordance with each of the light sources is provided at least with the reflective mirror 24c (an example of the third reflective mirror) that reflects the light beam (beam light) having passed through the fθ lens 23, which is a collecting lens, toward the photoreceptor drum 2 (an example of the image bearing member) and that the third reflective mirror 24c and the photoreceptor drum 2 are arranged opposing each other across the optical path reflected by the optical deflector 22 and passing through the fθ lens 23. Moreover, the second characteristic is that the reflected light from the third reflective mirror 24c passes between the first fθ lens 23a and the second fθ lens 23b constituting the lens 23, which are divided into two lenses, and is radiated to the photoreceptor drum 2.

The optical path in such optical scanning apparatus Y will be described referring to FIGS. 7A and 7B. FIGS. 7A and 7B illustrate a prior-art optical apparatus device and the optical path of the optical apparatus device according to this embodiment shown in FIG. 5 in comparison. FIG. 7A is matched with the configuration of this embodiment shown in FIG. 5 in order to compare the configuration of the reflective mirror group of the optical scanning apparatus shown in FIG. 6 with the configuration of this embodiment shown in FIG. 5.

Also, the first fθ lens 23a and the second fθ lens 23b are shown as one fθ lens 23.

Figure 34:
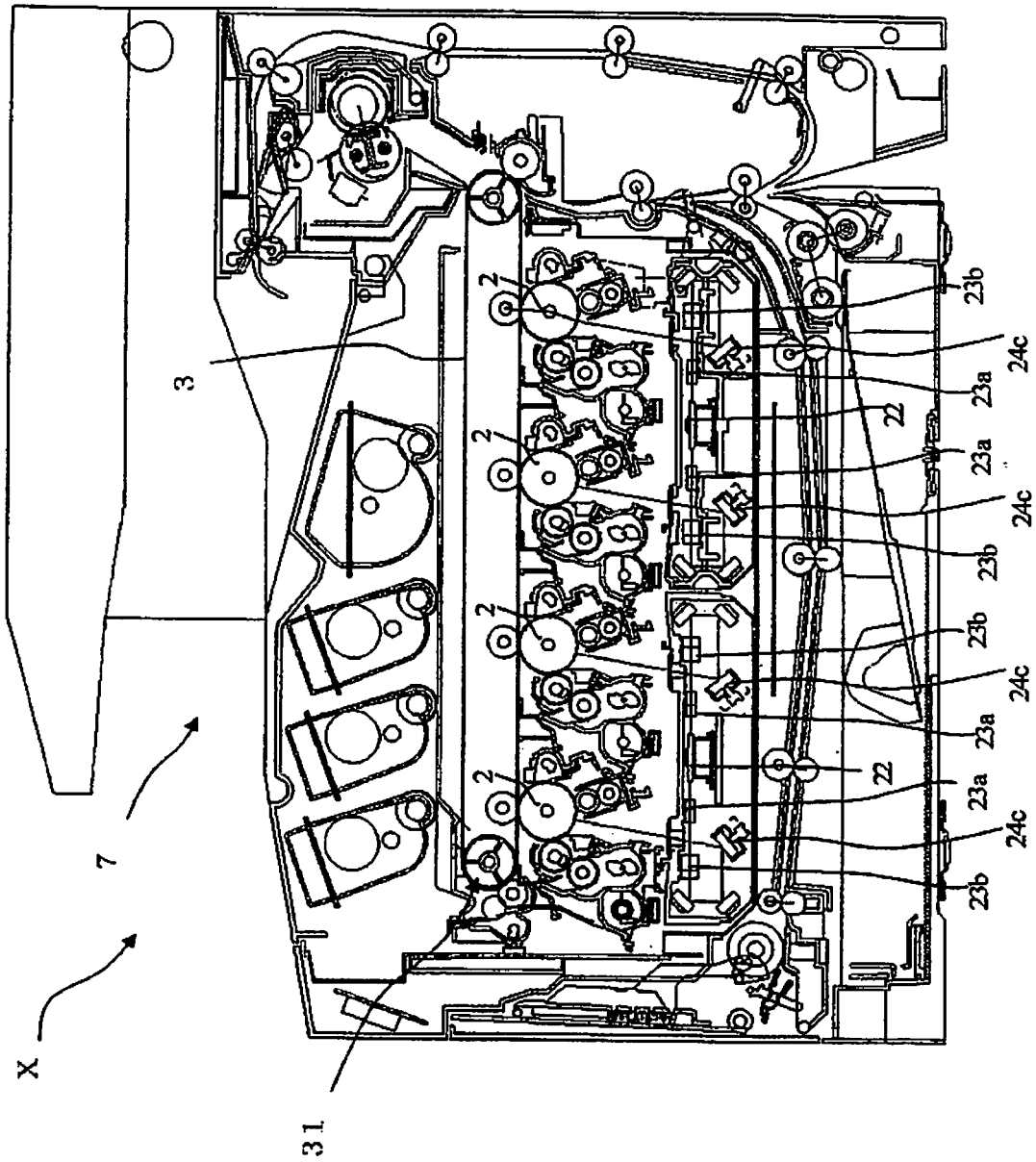
FIG. 34 is a side sectional view of the image forming apparatus illustrating a mounting state of an optical system to a housing of a main body of the image forming apparatus.

Also, as shown in FIG. 34, the lens group and the mirror group are attached to the housing of the main body of the image forming apparatus X.

Figure 6:
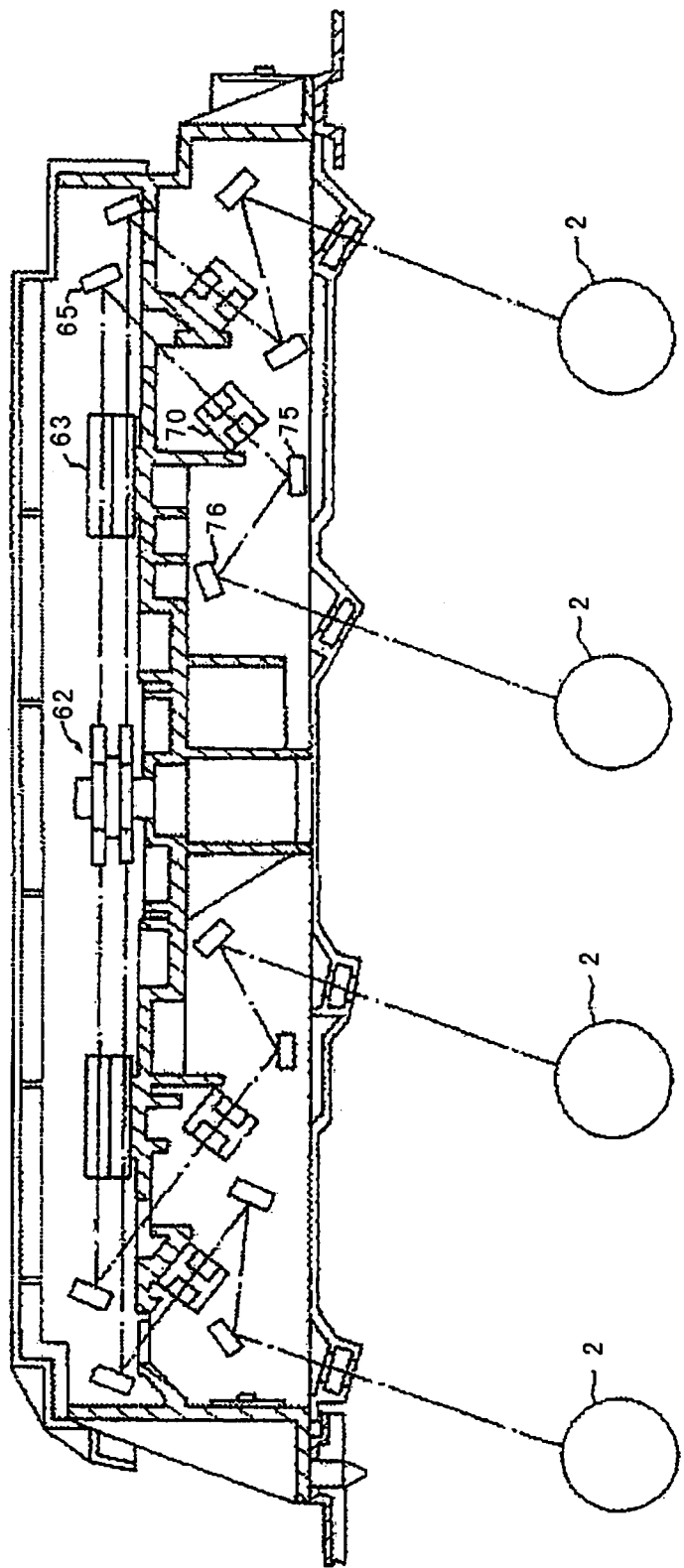
FIG. 6 is a sectional view of an optical scanning apparatus for explaining a prior-art technology of the present invention.
Figure 7A:
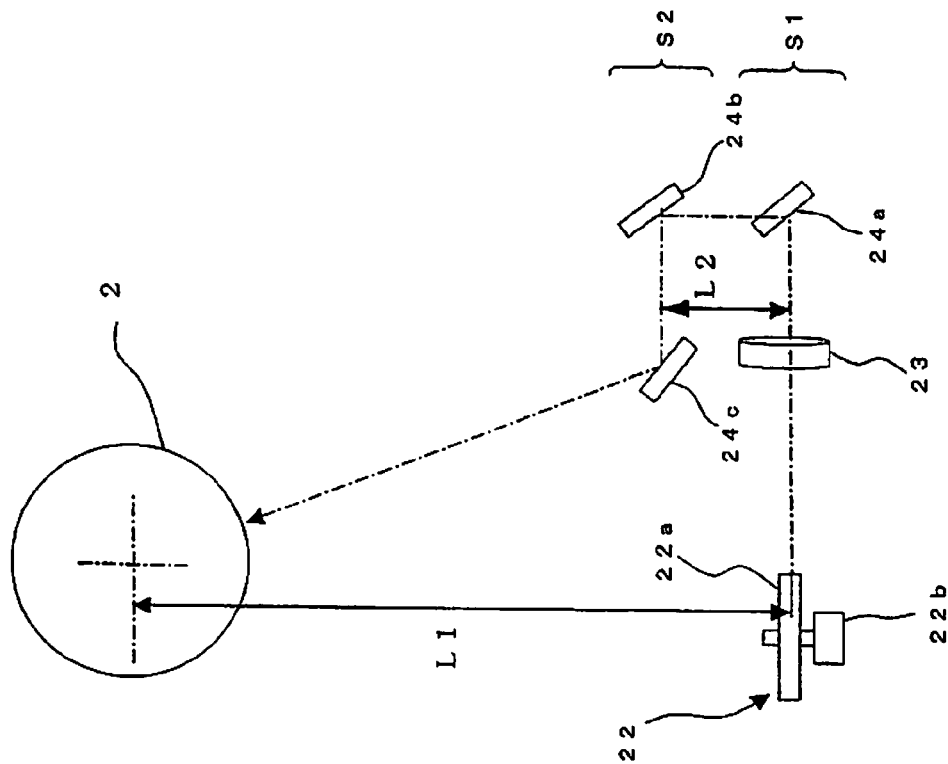
FIG. 7A is a diagram illustrating a prior-art optical scanning apparatus.
Figure 7B:
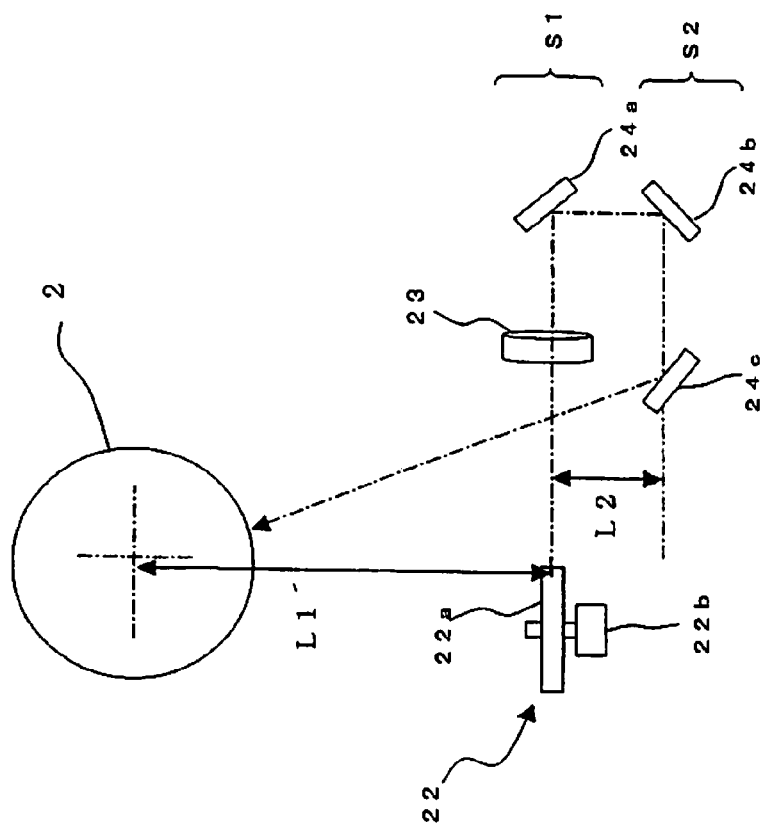
FIG. 7B is a diagram illustrating the optical scanning apparatus according to the first embodiment of the present invention.

As shown in FIGS. 7A and 7B, in the optical scanning apparatus (FIG. 7A) described in FIG. 6 for explaining a point that the optical scanning apparatus Y according to the embodiment of the present invention shown in FIG. 4 is different from the optical scanning apparatus in FIG. 6, the optical deflector layer S1, the reflective mirror layer S2, and the photoreceptor drum 2 are aligned vertically in this order. On the other hand, in the optical scanning apparatus Y (FIG. 7B) according to the embodiment of the present invention, the reflective mirror layer S2 and the photoreceptor drum 2 are aligned opposing each other with the optical deflector layer S1 at the center. That is, both are different in the arrangement of the reflective mirror layer S2, the optical deflector layer S1, and the photoreceptor drum 2.

As a result, supposing that a vertical distance between the light beam (beam light) reflected by the deflector 22 and the center of the photoreceptor drum 2 as L1 and a vertical distance between the light beam (beam light) reflected by the deflector 22 and the light beam (beam light) between the second reflective mirror 24b and the third reflective mirror 24c as L2 are fixed, the vertical distance L1 from the light beam (beam light) reflected by the deflector 22 to the center of the photoreceptor drum 2 can be reduced (to L1') by a portion of twice of the distance L2 (L2×2).

As a result, the size of the entire image forming apparatus can be reduced.

The above embodiment relates to an image forming apparatus of a color image, provided with a plurality of light sources. However, this invention can be also applied to a monochromic image forming apparatus provided with a single light source.

An embodiment in that case is, in FIG. 4, an optical scanning apparatus having only one of the first fθ lens 23a and second fθ lens 23b and also only one of the first reflective mirror 24a and the second reflective mirror 24b in the right and left. And this optical scanning apparatus is provided with the light source, the optical deflector 22 that reflects and deflects the light beam from the light source, one or more fθ lenses 23 installed in the reflection direction of the optical deflector 22 and through which the light beam reflected by the optical deflector 22 passes, the reflective mirror group 24 that guides the light beam having passed through the lens 23, and the photoreceptor drum 2 on which the light beam having been emitted from the light source and having passed through the reflective mirror group 24 forms an image. In this optical scanning apparatus, the reflective mirror group 24 disposed in accordance with the light source is configured by including at least the third reflective mirror 24c that reflects the light beam having passed through the fθ lens 23 toward the photoreceptor drum 2. And the third reflective mirror 24c and the photoreceptor drum 2 are arranged on the sides opposite to each other across the optical path of the light beam reflected by the optical deflector 22 and passing through the fθ lens 23.

The present invention has an object to provide an optical scanning apparatus of a reduced size.

In that sense, the object of the present invention can be achieved more effectively by combining with an optical scanning apparatus in which the size of a lens group is reduced.

Therefore, in the optical scanning apparatus according to this embodiment, the fθ lens 23 is divided into two lenses, that is, the first fθ lens 23a and the second fθ lens 23b as described above. And as described above, the reflected light from the third reflective mirror 24c passes between the divided two lenses, that is, the first fθ lens 23a and the second fθ lens 23b and radiates toward the image bearing member 2.

By means of such arrangement, various advantages, which will be described below, are obtained.

That is, as shown in FIG. 4, the polygon mirror 22 is rotated and driven by the rotation driving motor 22b. However, since the rotation speed thereof is high, the rotation driving motor 22b generates heat at a high temperature. Thus, a heat sink 22c for cooling is usually arranged below the rotation driving motor 22b. In this case, by arranging the third reflective mirror 24c at the position of 24d indicated by a broken line, it is theoretically possible to radiate the reflected light toward an arrow 24e. However, as described above, if the third reflective mirror is arranged at the position of 24d, it might interfere with the heat sink 22c. Also, even if interference between the third reflective mirror 24b and the heat sink 22c can be avoided, a distance between the heat sink 22c that can be heated to a high temperature and the third reflective mirror 24d can be too small. Thus, the temperature of the third reflective mirror 24d can be high, and the third reflective mirror 24d is deformed by the temperature. And the deformation of the third reflective mirror 24d causes a problem of distortion in an image. In that sense, in this embodiment, the third reflective mirror 24c is arranged at a position where the reflected light thereof passes between the two lenses, that is, the first fθ lens 23a and the second fθ lens 23b. As a result, the third reflective mirror 24c is separated away from the heat sink 22c. Therefore, the third reflective mirror 24c can avoid distortion caused by heat. And nonconformity such as distortion of an image can be avoided.

The same applies not only to the tandem-type color image forming apparatus but also to the monochromic image forming apparatus.

Also, in this embodiment, as described above, the reflective mirror 24b (an example of the second reflective mirror) that reflects the light beam to the third reflective mirror 24c and the reflective mirror 24a (an example of the first reflective mirror) that reflects the light reflected by the optical deflector 22 toward the second reflective mirror 24b are disposed. And the reflection angles of the second reflective mirror 24b and the first reflective mirror 24a are both set to 90 degrees. Reflection of the light at a right angle in this way is generally set with a reflective mirror. Thus, adjustment is easy. As a result, the direction of the reflected light is stabilized, and distortion of an image is reduced. Also, by means of such a configuration, the optical system is simplified. Therefore, it can also contribute to size reduction of the optical scanning apparatus.

[Embodiment]

A first embodiment below relates to an optical scanning apparatus that can reduce the size of a lens group by separating an fθ lens into two parts.

By applying the optical scanning apparatus according to the present invention to an optical portion of an optical scanning apparatus that can reduce the size of a lens group, an optical scanning apparatus of a smaller size can be realized. Alternatively, without applying the present invention to the optical portion of such an optical scanning apparatus that can reduce the size of the lens group, size reduction of the optical scanning apparatus can be realized by combining with it.

Figure 8:
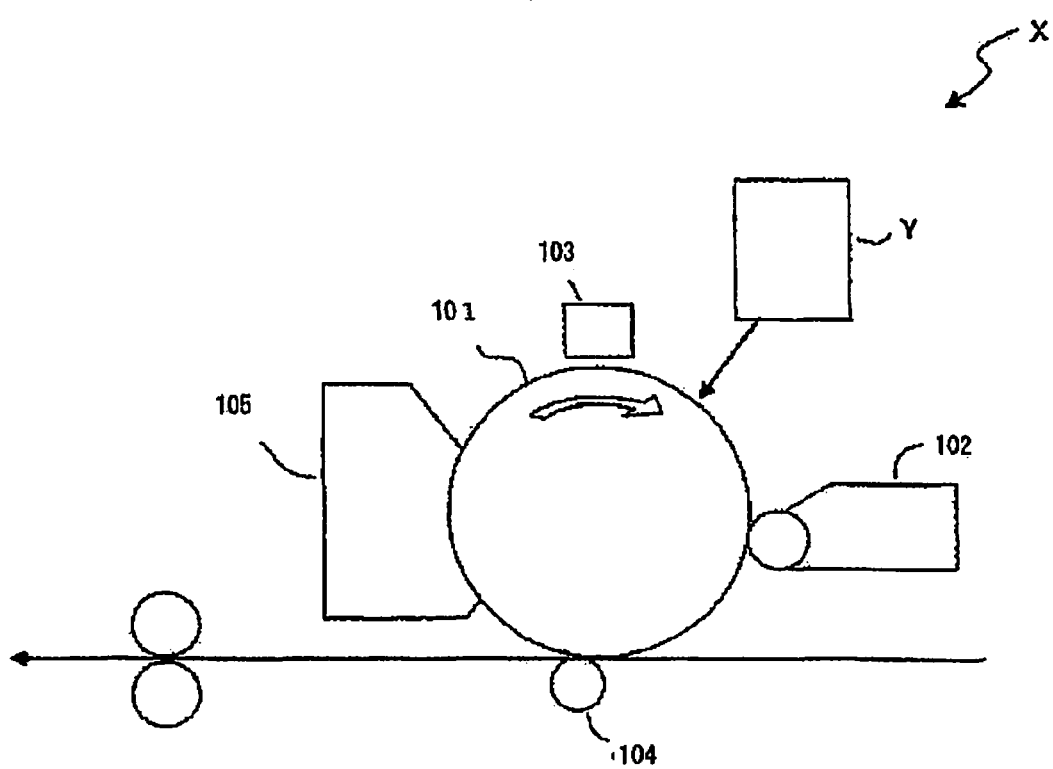
FIG. 8 is an outline configuration diagram of an essential part (image forming portion) of an image forming apparatus X provided with an optical scanning apparatus Y according to this embodiment.
Figure 9:
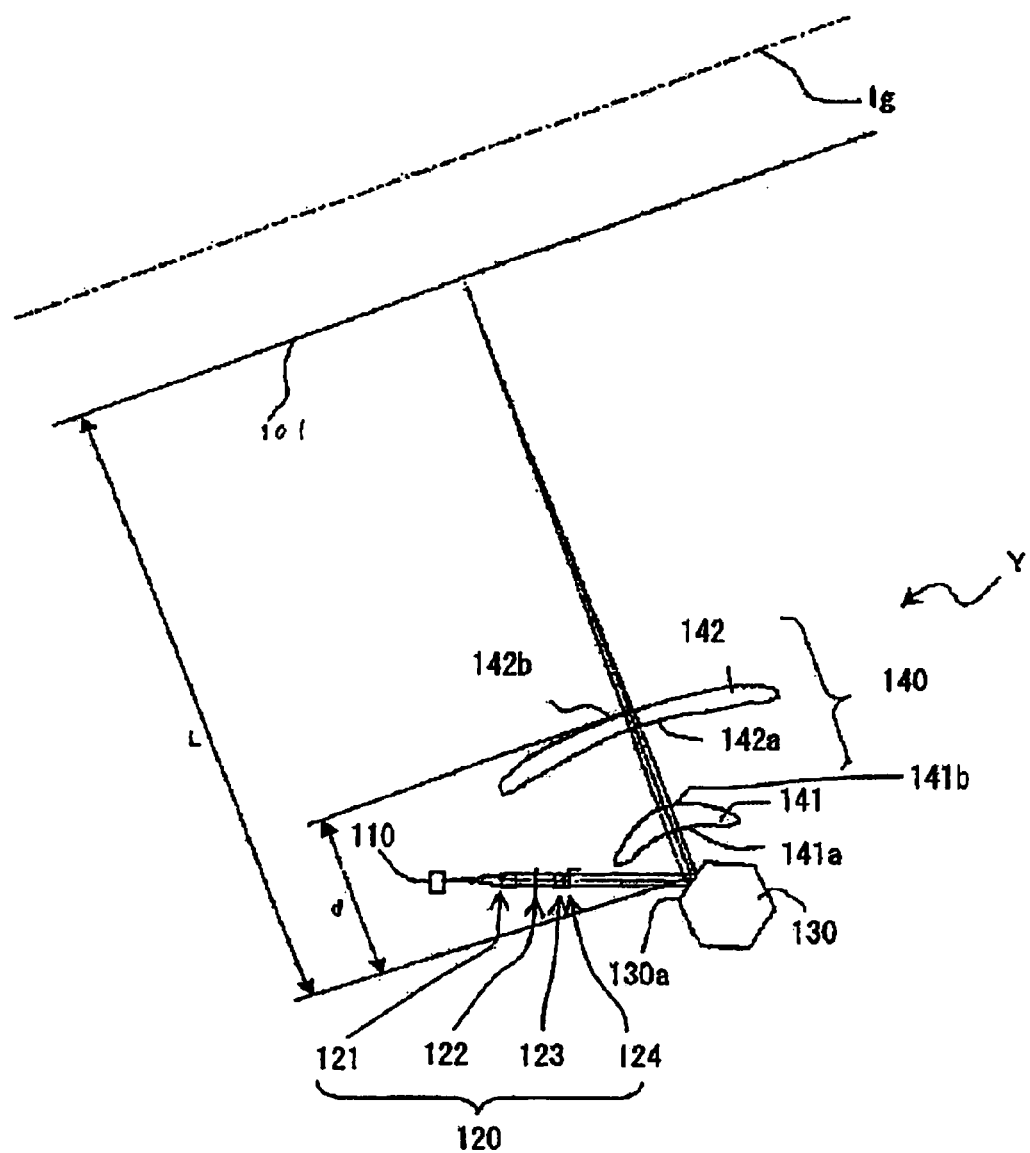
FIG. 9 is a schematic diagram of the optical scanning apparatus Y and an optical path of beam light when seen from the sub scanning direction.
Figure 10:
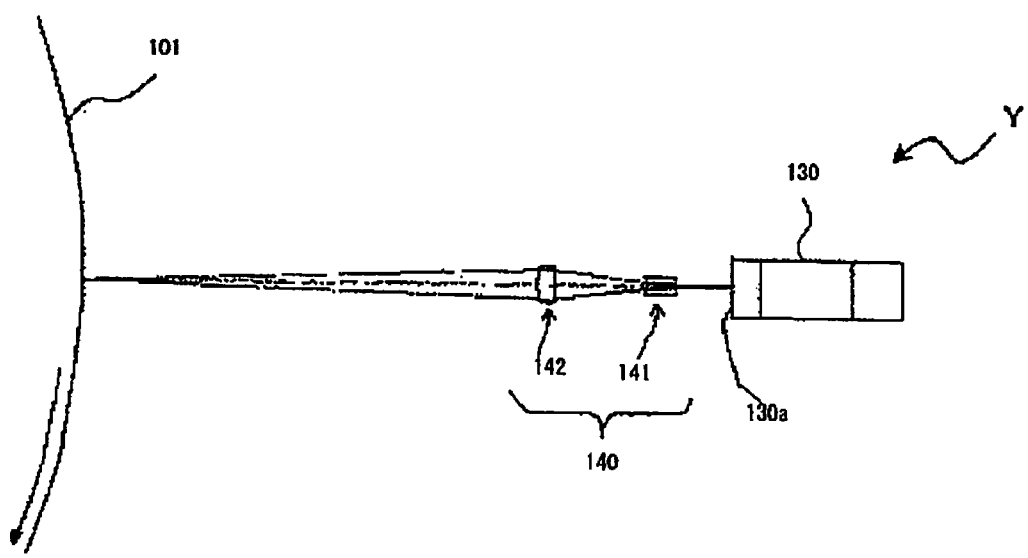
FIG. 10 is a schematic diagram of a section of the optical scanning apparatus Y and an optical path of scanning light when seen from the main scanning direction.
Figure 12:
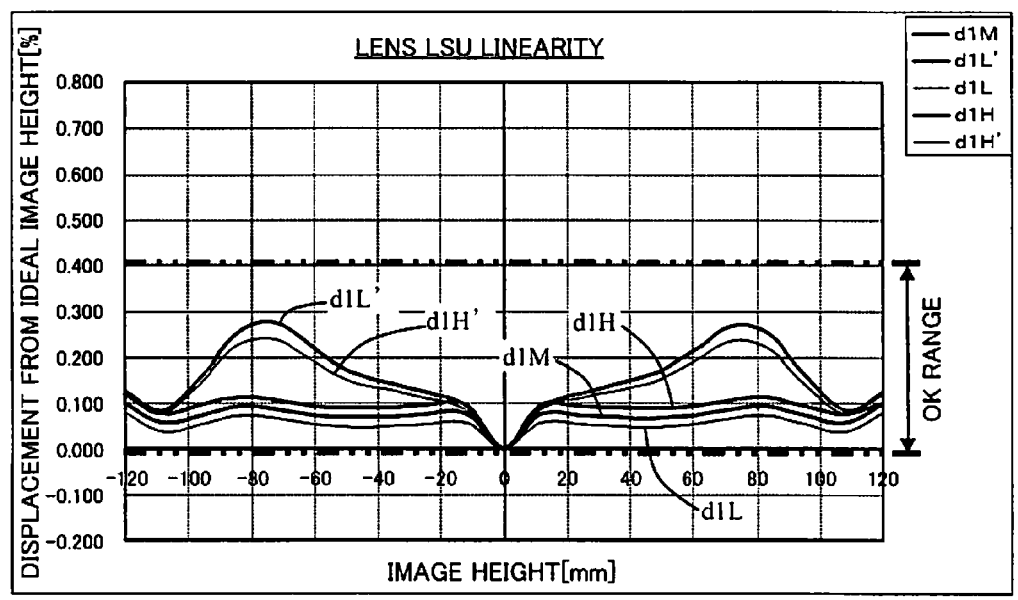
FIG. 12 is a graph illustrating an experiment result that evaluates an influence of a change of a first power condition in the main scanning direction of a scanning light lens in the optical scanning apparatus Y on linearity of the scanning light.
Figure 13:
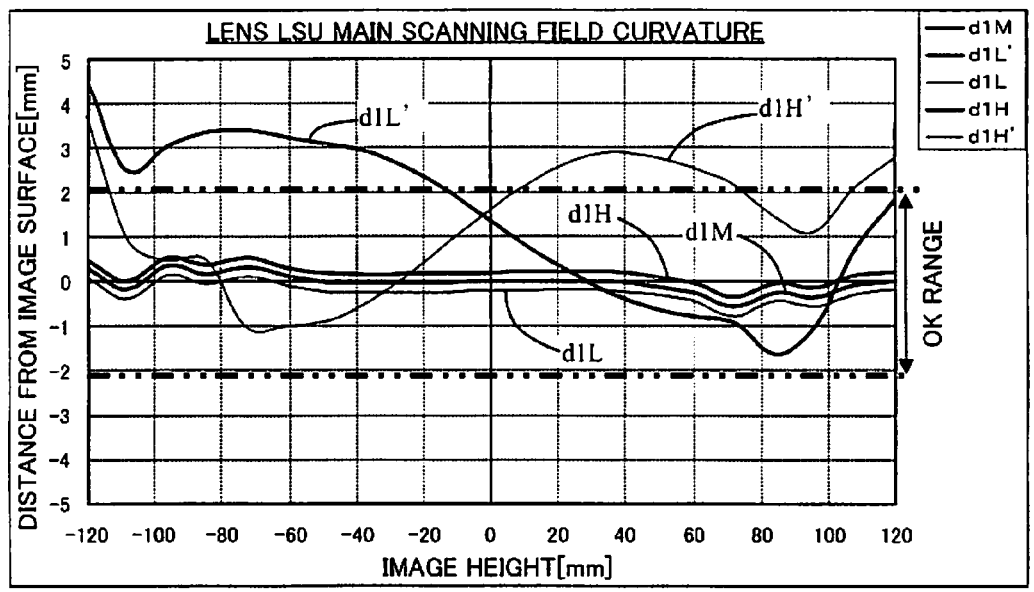
FIG. 13 is a graph illustrating an experiment result that evaluates an influence of a change of the first power condition in the main scanning direction of the scanning light lens in the optical scanning apparatus Y on the field curvature in the main scanning direction.
Figure 14:
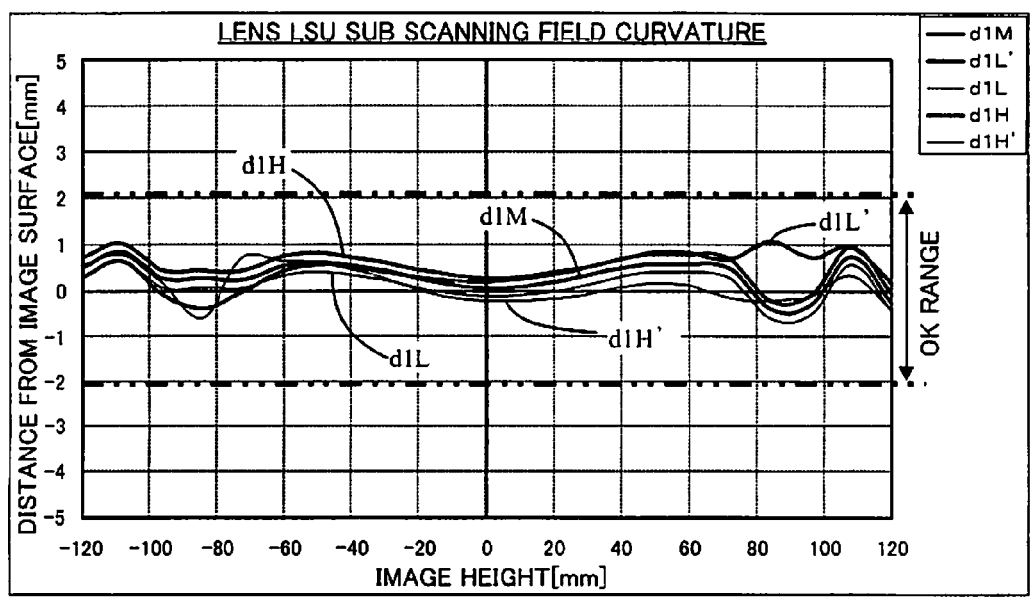
FIG. 14 is a graph illustrating an experiment result that evaluates an influence of a change of the first power condition in the main scanning direction of the scanning light lens in the optical scanning apparatus Y on the field curvature in the sub scanning direction.
Figure 15:
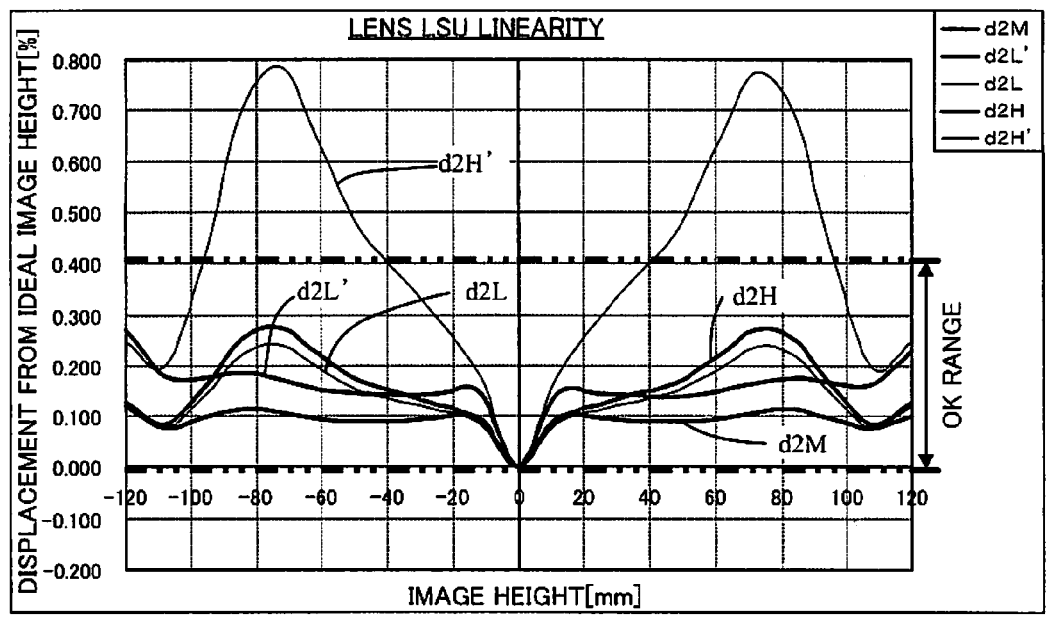
FIG. 15 is a graph illustrating an experiment result that evaluates an influence of change of a second power condition in the main scanning direction of the scanning light lens in the optical scanning apparatus Y on linearity of the scanning light.
Figure 16:
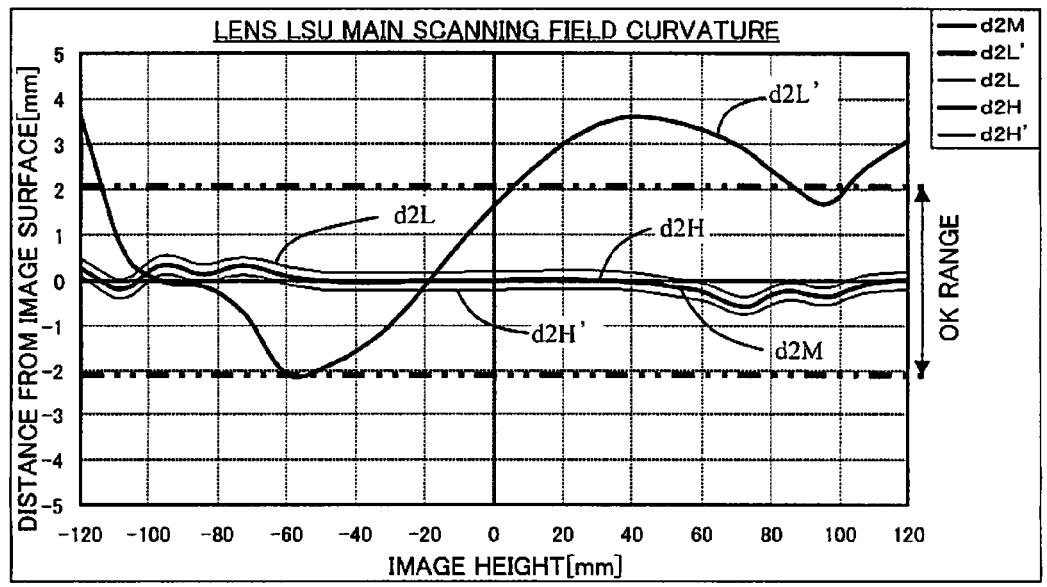
FIG. 16 is a graph illustrating an experiment result that evaluates an influence of a change of the second power condition in the main scanning direction of the scanning light lens in the optical scanning apparatus Y on field curvature in the main scanning direction.
Figure 17:
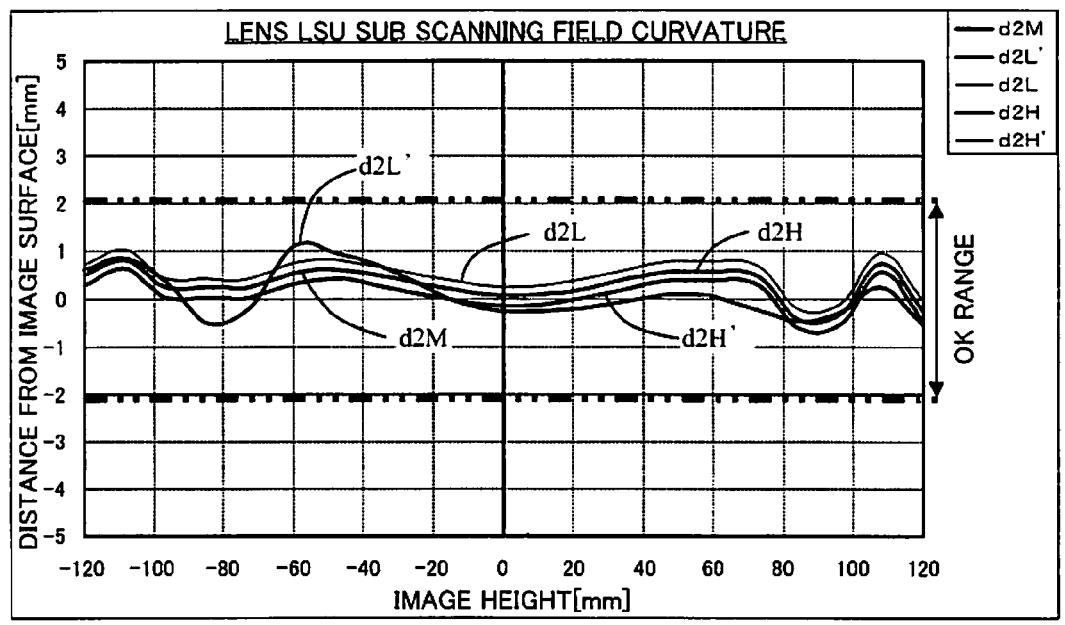
FIG. 17 is a graph illustrating an experiment result that evaluates an influence of a change of the second power condition in the main scanning direction of the scanning light lens in the optical scanning apparatus Y on the field curvature in the sub scanning direction.
Figure 18:
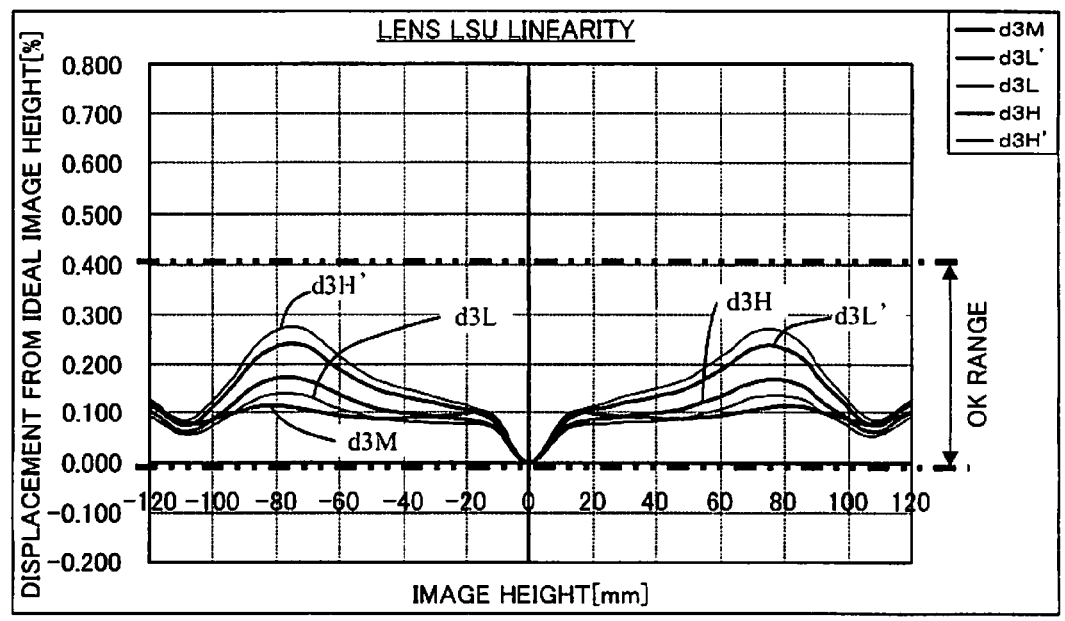
FIG. 18 is a graph illustrating an experiment result that evaluates an influence of a change of a power condition in the sub scanning direction of the scanning light lens in the optical scanning apparatus Y on linearity of the scanning light.
Figure 19:
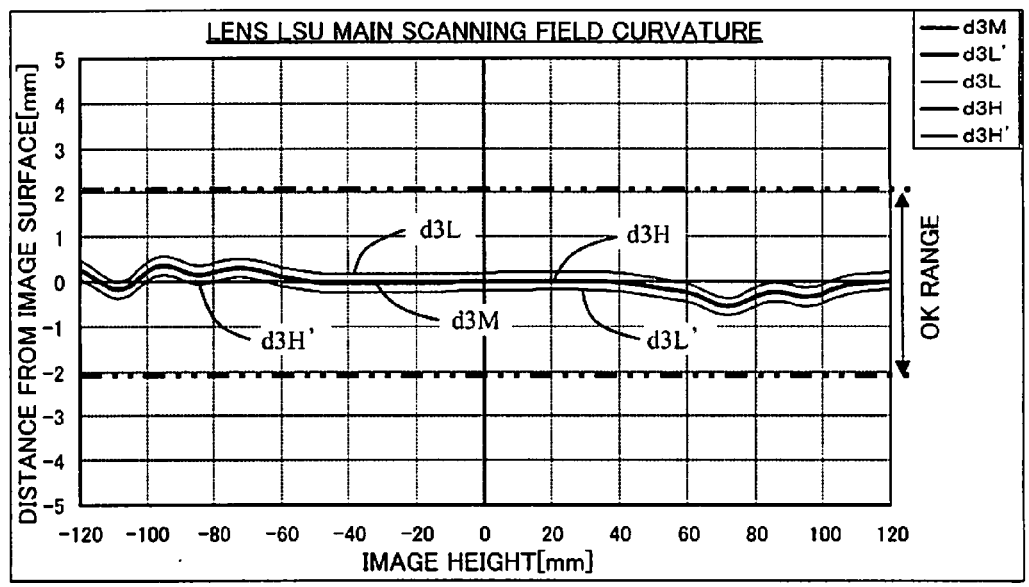
FIG. 19 is a graph illustrating an experiment result that evaluates an influence of a change of the power condition in the sub scanning direction of the scanning light lens in the optical scanning apparatus Y on the field curvature in the main scanning direction.
Figure 20:
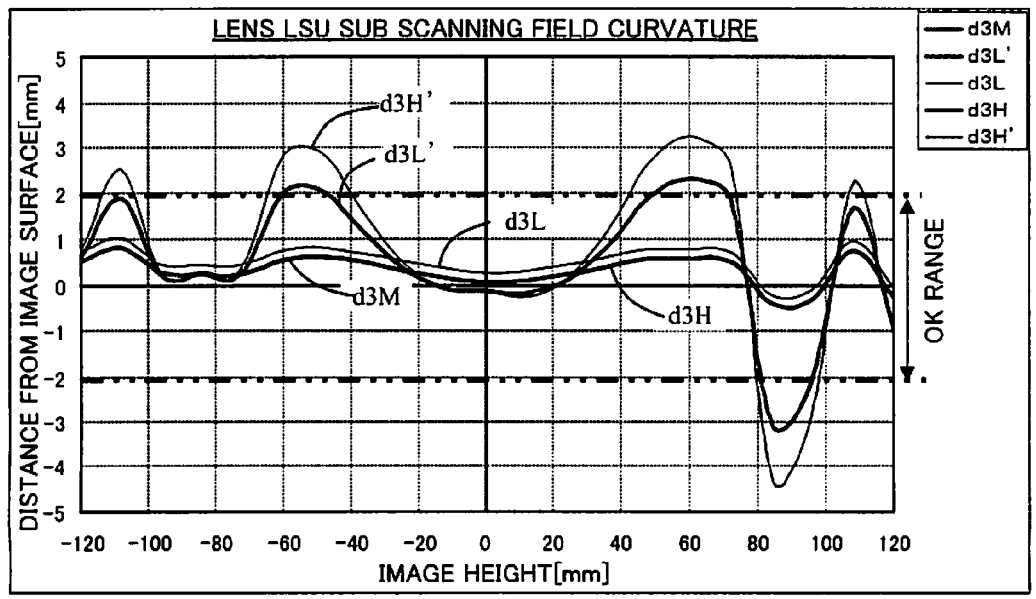
FIG. 20 is a graph illustrating an experiment result that evaluates an influence of a change of the power condition in the sub scanning direction of the scanning light lens in the optical scanning apparatus Y on the field curvature in the sub scanning direction.
Figure 21:
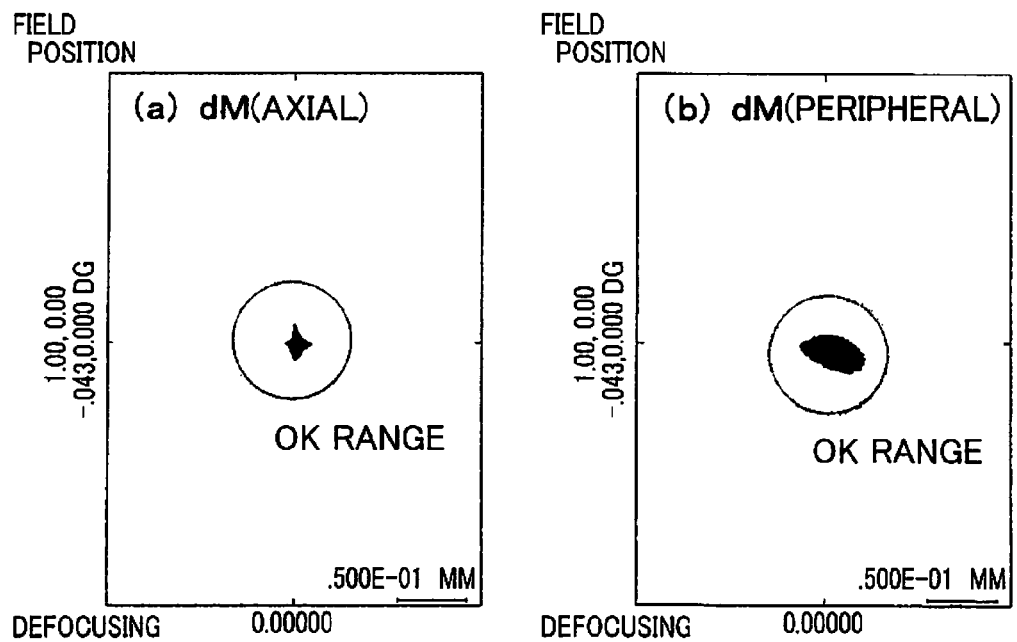
FIG. 21 are spot diagrams of scanning light by the optical scanning apparatus Y.
Figure 22:
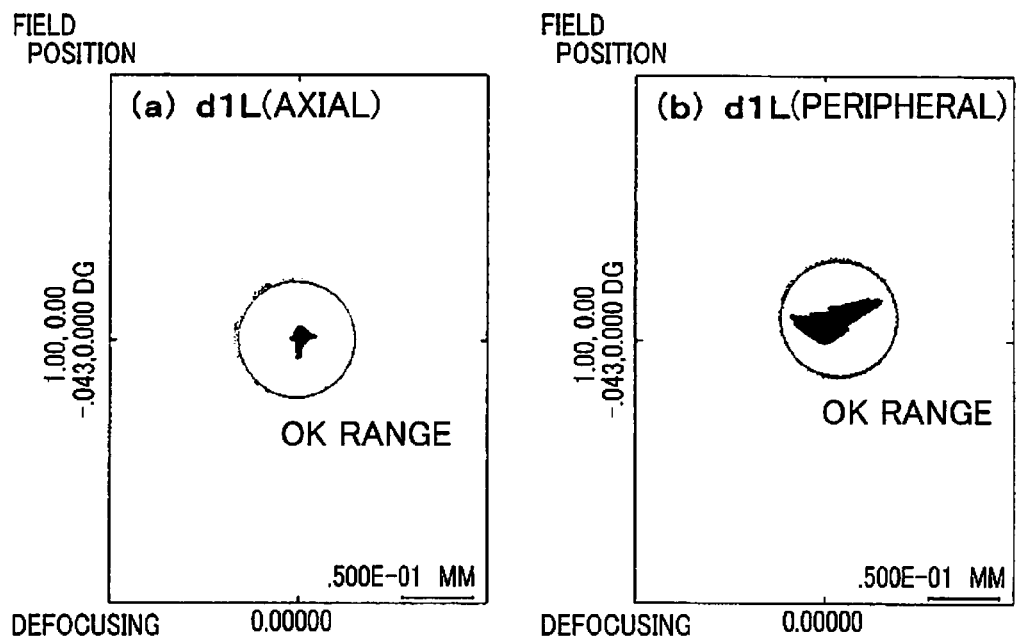
FIG. 22 are spot diagrams of the scanning light when the first power condition in the main scanning direction of the scanning light lens in the optical scanning apparatus Y is changed.
Figure 27:
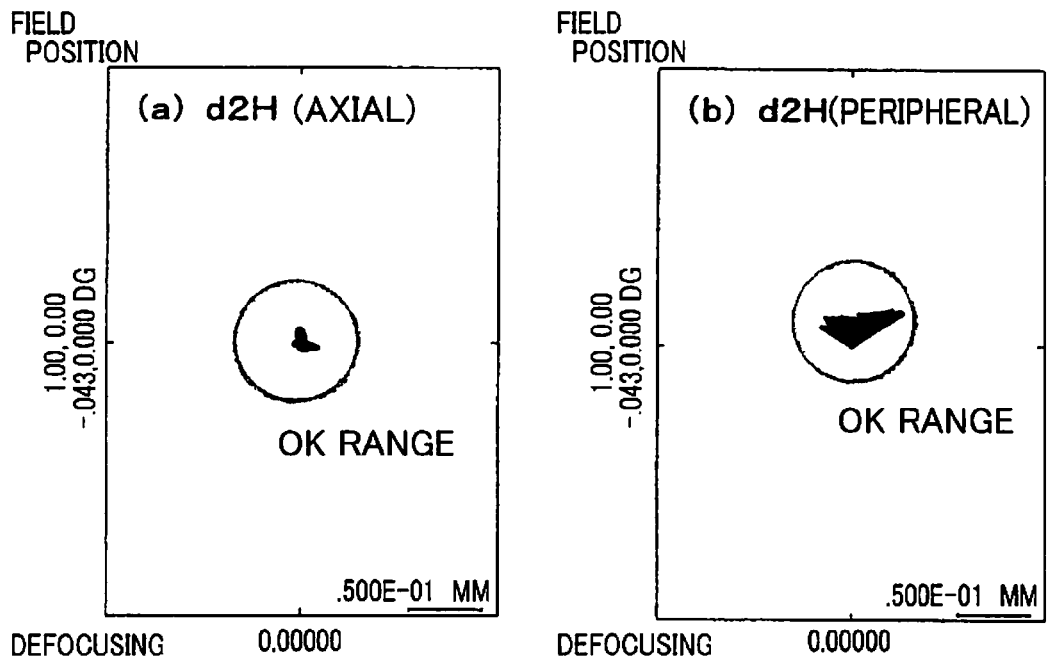
FIG. 27 are spot diagrams of the scanning light when the second power condition in the main scanning direction of the scanning light lens in the optical scanning apparatus Y is changed.
Figure 28:
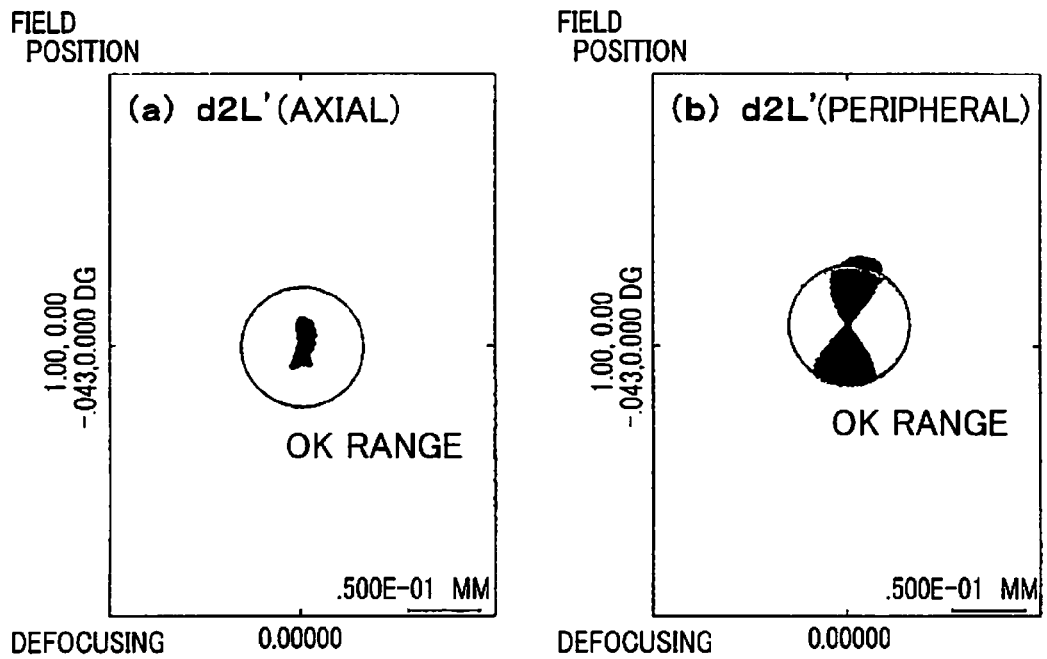
FIG. 28 are spot diagrams of the scanning light when the second power condition in the main scanning direction of the scanning light lens in the optical scanning apparatus Y is changed.
Figure 29:
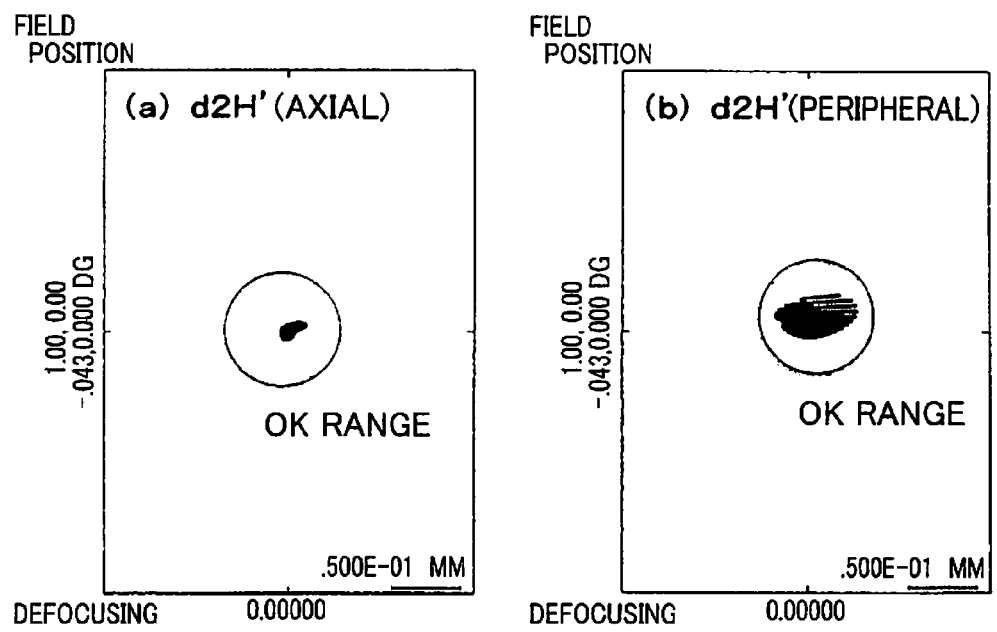
FIG. 29 are spot diagrams of the scanning light when the second power condition in the main scanning direction of the scanning light lens in the optical scanning apparatus Y is changed.
Figure 30:
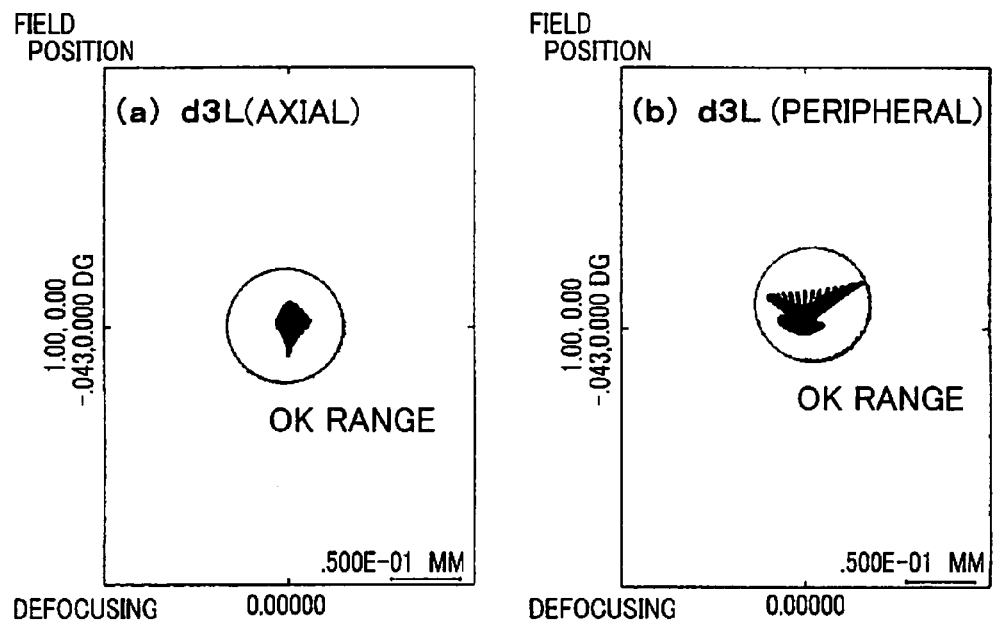
FIG. 30 are spot diagrams of the scanning light when the power condition in the sub scanning direction of the scanning light lens in the optical scanning apparatus Y is changed.

Here, FIG. 8 is an outline configuration diagram of an essential part (image forming portion) of the image forming apparatus X provided with the optical scanning apparatus Y that can reduce the size of the lens group proposed by the inventor. FIG. 9 is a schematic diagram of the optical scanning apparatus Y and an optical path of beam light when seen from the sub scanning direction. FIG. 10 is a schematic diagram of the optical scanning apparatus Y and an optical path of scanning light when seen from the main scanning direction. FIG. 11 is a diagram illustrating an example of execution conditions of the optical scanning apparatus Y. FIG. 12 is a graph illustrating an experiment result that evaluates an influence of change of a first power condition in the main scanning direction of a scanning light lens in the optical scanning apparatus Y on linearity of the scanning light. FIG. 13 is a graph illustrating an experiment result that evaluates an influence of change of the first power condition in the main scanning direction of the scanning light lens in the optical scanning apparatus Y on the field curvature in the main scanning direction. FIG. 14 is a graph illustrating an experiment result that evaluates an influence of change of the first power condition in the main scanning direction of the scanning light lens in the optical scanning apparatus Y on the field curvature in the sub scanning direction. FIG. 15 is a graph illustrating an experiment result that evaluates an influence of change of a second power condition in the main scanning direction of the scanning light lens in the optical scanning apparatus Y on linearity of the scanning light. FIG. 16 is a graph illustrating an experiment result that evaluates an influence of change of the second power condition in the main scanning direction of the scanning light lens in the optical scanning apparatus Y on the field curvature in the main scanning direction. FIG. 17 is a graph illustrating an experiment result that evaluates an influence of change of the second power condition in the main scanning direction of the scanning light lens in the optical scanning apparatus Y on the field curvature. FIG. 18 is a graph illustrating an experiment result that evaluates an influence of change of a power condition in the sub scanning direction of the scanning light lens in the optical scanning apparatus Y on linearity of the scanning light. FIG. 19 is a graph illustrating an experiment result that evaluates an influence of change of the power condition in the sub scanning direction of the scanning light lens in the optical scanning apparatus Y on the field curvature in the main scanning direction. FIG. 20 is a graph illustrating an experiment result that evaluates an influence of change of the power condition in the sub scanning direction of the scanning light lens in the optical scanning apparatus Y on the field curvature in the sub scanning direction. FIG. 21 are spot diagrams of scanning light by the optical scanning apparatus Y. FIGS. 22 to 25 are spot diagrams of the scanning light when the first power condition in the main scanning direction of the scanning light lens in the optical scanning apparatus Y is changed. FIGS. 26 to 29 are spot diagrams of the scanning light when the second power condition in the main scanning direction of the scanning light lens in the optical scanning apparatus Y is changed. FIGS. 30 to 33 are spot diagrams of the scanning light when the power condition in the sub scanning direction of the scanning light lens in the optical scanning apparatus Y is changed.

First, a configuration of the essential part of the image forming apparatus X provided with the optical scanning apparatus Y according to this embodiment will be described referring to FIG. 8.

The image forming apparatus X is an electrophotographic image forming apparatus such as a copier, a printer, a facsimile machine and the like that forms an image using a toner.

The image forming apparatus X is provided with the image forming portion (the portion shown in FIG. 8) that performs image formation on recording paper by forming a toner image, a paper feeding portion (not shown) that supplies the recording paper to the image forming portion, a paper discharge portion (not shown) from which the recording paper on which the image was formed is discharged and the like.

As shown in FIG. 8, the image forming apparatus X is configured by including a photoreceptor drum 101 (image bearing member), a charging device 103, the optical scanning apparatus Y, a developing device 102, a transfer roller 104, a neutralizing device 105 and the like. The photoreceptor drum 101 (image bearing member) carries a toner image. The charging device 103 is to uniformly charge the surface of the photoreceptor drum 101 along its axial direction. The optical scanning apparatus Y writes an electrostatic latent image by scanning the surface of the photoreceptor drum 101 with beam light and exposing the surface to the scanning light.

The developing device 102 supplies a toner to the electrostatic latent image so as to develop the electrostatic latent image as a toner image. The transfer roller 104 transfers the toner image to the recording paper. The neutralizing device 105 neutralizes the surface of the photoreceptor drum 101 after transfer of the toner image to the recording paper. The developing device 102 is provided with a developing roller that supplies the toner to the photoreceptor drum 101 so as to visualize the electrostatic latent image on the photoreceptor drum 101 with the toner. In accordance with a potential gap between a potential applied to the developing roller (development bias potential) and a potential on the surface of the photoreceptor drum 101, the toner on the developing roller is attracted onto the surface of the photoreceptor drum 101. Then, the electrostatic latent image is visualized as the toner image.

The image forming apparatus X is provided with other known constituent elements disposed in a general electrophotographic image forming apparatus, but the description will be omitted here.

Subsequently, the configuration of the optical scanning apparatus Y according to this embodiment will be described referring to FIGS. 9 and 10.

As shown in FIGS. 9 and 10, the optical scanning apparatus Y is provided with a light source 110, an incident light adjusting optical device 120, a polygon mirror 130, and an image-forming optical device 140 (fθ lens system).

The light source 110 is a light source such as a semiconductor laser that emits beam light (light flux) for forming an electrostatic latent image. The incident light adjusting optical device 120 is provided with a collimator lens 121, an aperture 122, and a cylindrical lens 123 in the order from the light source 110 side in a path of the beam light (light flux) between the light source 110 and the polygon mirror 130.

The incident light adjusting optical device 120 shapes outgoing light (beam light) from the light source 110 by these optical devices before incidence to the polygon mirror 130.

The beam light emitted from the light source 110 is converted to parallel light by passing through the collimator lens 121. After that, the beam light having been converted to the parallel light is shaped by passing through the aperture 122. Moreover, the shaped beam light has a beam diameter adjusted by the cylindrical lens 123 and then, reaches the polygon mirror 130.

Also, on the surface of the cylindrical lens 123, a diffraction optical element 124 is disposed. This diffraction optical element 124 may be arranged at another position as long as it is in an optical path from passage of the beam light (light flux) through the collimator lens 121 and to the polygon mirror 130. An action of this diffraction optical element 124 will be described later.

The polygon mirror 130 is a rotating body having a plurality of reflection surfaces 130a. The polygon mirror 130 reflects the beam light (light flux) for electrostatic latent image formation emitted from the light source 110 by its reflection surface 130a and directs it to the surface of the photoreceptor drum 101, which is a surface to be scanned, so as to scan the surface in the main scanning direction (direction parallel with a rotation axis 1g of the photoreceptor drum 101), which is a linear direction (an example of the optical scanning means). As scanning means of the beam light, a MEMS mirror and the like may be used in addition to the polygon mirror 130. The image-forming optical device 140 is arranged between the polygon mirror 130 and the surface of the photoreceptor drum 101.

The image-forming optical device 140 is a lens system that makes the beam light scanned by the polygon mirror 130 (hereinafter referred to as scanning light) form an image on the surface of the photoreceptor drum 101 (radiated while being adjusted to a desired spot diameter) and also functions as a so-called fθ lens that makes the scanning speed of the scanning light on the surface of the photoreceptor drum 101 substantially constant (an example of the image forming means). As shown in FIGS. 9 and 10, the image-forming optical device 140 is provided with a first scanning light lens 141 (corresponding to the first fθ lens 23a) and a second scanning light lens 142 (corresponding to the second fθ lens 23b) in the order from the upstream side in the traveling direction of the scanning light.

FIG. 10 is a sectional view at a center position in a scanning range of the light in the main scanning direction (the center positions of the first scanning light lens 141 and the second scanning light lens 142 in the main scanning direction). Also, the optical path of the scanning light shown in FIG. 9 is an optical path when the scanning light of the polygon mirror 130 is at the center position of a main scanning range (full scanning range in the main scanning direction).

The first scanning light lens 141 is arranged at a position closer to the polygon mirror 130 than the second scanning light lens 142. The first scanning light lens 141 is a lens formed extending in the main scanning direction so that the scanning light can pass therethrough. The first scanning light lens 141 is a lens having positive power in the main scanning direction and negative power in a direction orthogonal to the main scanning direction (a direction orthogonal to the rotation axis 1g of the photoreceptor drum 101 and hereinafter referred to as a sub scanning direction) (corresponding to the first fθ lens 23a).

Also, the second scanning light lens 142 is arranged on the surface side of the photoreceptor drum 101 rather than the first scanning light lens 141. The second scanning light lens 142 is a lens formed extending in the main scanning direction so that the scanning light can pass therethrough. The second scanning light lens 142 has a wider scanning range of the scanning light than the first scanning light lens 141 by the portion for which the position is farther from the polygon mirror 130. Thus, the second scanning light lens 142 has a larger dimension (width) in the main scanning direction than the first scanning light lens 141. This second scanning light lens 142 is a lens having negative power in the main scanning direction and positive power in the sub scanning direction (corresponding to the second fθ lens 23b).

Here, the first scanning light lens 141 and the second scanning light lens 142 are arranged on the side closer to the reflection surface 130a of the polygon mirror 130 than an intermediate position of the reflecting surface 130a of the polygon mirror 130 and the surface of the photoreceptor drum 101. That is, supposing that a distance from the reflection surface 130a of the polygon mirror 130 to the surface of the photoreceptor drum 101 is L and a distance from the reflection surface 130a of the polygon mirror 130 to a surface 142b on the photoreceptor drum 101 side of the second scanning light lens 142 is d, the distance d is a distance shorter than the half of the distance L (d<L/2).

In the image-forming optical device 140 of the optical scanning apparatus Y, as shown in FIG. 10, the width of the scanning light in the sub scanning direction after the passage through the first scanning light lens 141 is wider by means of the first scanning light lens 141 having negative power in the sub scanning direction. Thus, in the optical scanning apparatus Y, even if the second scanning light lens 142 is arranged at a position relatively far from the surface of the photoreceptor drum 101 (a position closer to the polygon mirror 130), a sub scanning power (power in the sub scanning direction) of the scanning light on the surface of the photoreceptor drum 101 can be decreased. Also, at a position closer to the polygon mirror 130 (d<L/2), a light scanning range is relatively narrow. Thus, the dimension of the second scanning light lens 142 in the main scanning direction arranged at the position can be made small. Therefore, the optical scanning apparatus Y is compact and also has a small field curvature in the sub scanning direction on the surface of the photoreceptor drum 101. The field curvature indicates a degree in a scanning width by which a focus position (image surface) is separated away from the photoreceptor surface (ideal focal plane) to the depth direction (direction to which the light travels for image formation).

Here, if the positions of the first scanning light lens 141 and the second scanning light lens 142 are separated away from the surface of the photoreceptor drum 101, in order to make the scanning light form an image (converge) on the surface of the photoreceptor drum 101, the shapes of the first scanning light lens 141 and the second scanning light lens 142 need to be rotationally symmetrically aspheric. For that purposes, by employing a lens made of resin for the first scanning light lens 141 and the second scanning light lens 142, the first scanning light lens 141 and the second scanning light lens 142 can be manufactured (worked) relatively easily.

A sectional shape in the sub scanning direction (rotationally symmetrically aspheric surface) of each surface of the first scanning light lens 141 (a surface 141a on the scanning light incident side and the surface 141b on the outgoing side) and each surface of the second scanning light lens 142 (a surface 142a on the scanning light incident side and the surface 142b on the outgoing side) can be expressed by the following (c1) equation:

$$\begin{cases} f(y) = \cfrac{y^2/r_m}{1+\sqrt{1-(1+K_m)y^2/r_m^2}} A_3 y^3 + A_4 y^4 + A_5 y^5 + A_6 y^6 + A_8 y^8 + A_{10} y^{10} \\ r_s = r_{s0} + B_1 y + B_2 y^2 + B_3 y^3 + B_4 y^4 + B_6 y^6 + B_8 y^8 + B_{10} y^{10} \\ x = f(y) + r_s \left( I - \sqrt{1-(z/r_s)^2} \right) \end{cases} \quad c1$$

In the (c1) equation, reference character x designates a sag amount in the optical axis direction of the scanning light (beam light). Reference character y designates a position in the main scanning direction based on the center line (bisector) of the scanning range in the main scanning direction. Reference character z designates a position in the sub scanning direction. Reference character rm designates curvature of a section in the main scanning direction at the center line in the scanning range in the main scanning direction of the scanning light (beam light). Reference character rs0 designates curvature of a section in the sub scanning direction at the center position of the scanning range in the main scanning direction of the scanning light (beam light). Reference character Km designates conic constant. Reference characters A3, A4, A6, A8, A10, and B1 to B4 are factors (aspheric factors) set as appropriate for each surface.

The power in the sub scanning direction of the first scanning light lens 141 is negative. Thus, the dimension (height) in the sub scanning direction of the second scanning light lens 142 is somewhat larger. However, reduction of the dimension (width) in the main scanning direction of the second scanning light lens 142 has a great contribution to size reduction of the apparatus than some increase of the dimension (height) in the sub scanning direction of the second scanning light lens 142.

Also, in the image-forming optical device 140, collection of the scanning light in the main scanning direction is performed only by the first scanning light lens 141. Thus, the curvature and thickness of the first scanning light lens 141 become large. However, even if the curvature and thickness of the first scanning light lens 141 of a small dimension (width) in the main scanning direction are increased, since collection of the scanning light in the main scanning direction is performed only by the first scanning light lens 141, the entire apparatus can be made more compact than the case in which a part of light collection is performed by the second scanning light lens 142 of a large dimension in the main scanning direction (the power in the main scanning direction of the second scanning light lens 142 is made positive).

Also, the second scanning light lens 142 that mainly adjusts the focal distance of the scanning light is a thin lens with small curvature (the power in the main scanning direction is negative). Thus, the field curvature in the main scanning direction on the surface of the photoreceptor drum 101 can be easily kept small.

FIG. 11 illustrates an example of execution conditions of the optical scanning apparatus Y.

In the conditions shown in FIG. 11, surface numbers "1" to "4" of the scanning light lens are identification numbers that refer to the surface 141*a* on the scanning light incident side of the first scanning light lens 141, the surface 141*b* on the scanning light outgoing side of the first scanning light lens 141, the surface 142*a* on the scanning light incident side of the second scanning light lens 142, and the surface 142*b* on the scanning light outgoing side of the second scanning light lens 142, respectively. Also, the aspheric factor and the conic constant are factors applied to the (c1) equation.

Subsequently, appropriate conditions of the two scanning light lenses 141 and 142 will be described referring to FIGS. 12 to 33.

FIG. 21 illustrate spot diagrams (illustrating variations of spot center positions on the surface of the photoreceptor drum 101) of the scanning light in the optical scanning apparatus Y that satisfies the execution conditions shown in FIG. 11.

Also, FIGS. 12 to 14 and FIGS. 22 to 25 are graphs illustrating linearity of the scanning light, the field curvature in the main scanning direction (main scanning field curvature), the field curvature in the sub scanning direction (sub scanning field curvature), and variation of the spot center positions when the condition relating to power in the main scanning direction of the two scanning light lenses 141 and 142 (hereinafter referred to as a first main scanning direction power condition), which will be described later, is changed based on the execution conditions shown in FIG. 11.

Also, FIGS. 15 to 17 and FIGS. 26 to 29 are graphs illustrating linearity of the scanning light, the field curvature in the main scanning direction (main scanning field curvature), the field curvature in the sub scanning direction (sub scanning field curvature), and variation of the spot center positions when the condition relating to power in the main scanning direction of the two scanning light lenses 141 and 142 (hereinafter referred to as a second main scanning direction power condition), which will be described later, is changed based on the execution conditions shown in FIG. 11.

Also, FIGS. 18 to 20 and FIGS. 30 to 33 are graphs illustrating linearity of the scanning light (relative displacement with respect to an ideal image height), the field curvature in the main scanning direction (main scanning field curvature), the field curvature in the sub scanning direction (sub scanning field curvature), and variation of the spot center positions when the condition relating to power in the sub scanning direction of the two scanning light lenses 141 and 142 (hereinafter referred to as sub scanning direction power condition), which will be described later, is changed based on the execution conditions shown in FIG. 11. The linearity of the scanning light indicates, based on a state in which the scanning light is scanned in the main scanning direction at a targeted constant speed on the surface of the photoreceptor drum 101 (linear state), the size of displacement of the actual scanning position with respect to a scanning position in the reference state (ideal image height).

In FIGS. 12 to 20, the lateral axis indicates the image height (position in the main scanning direction based on the center of the main scanning range). Also, in FIGS. 12 to 33, the range indicated as "OK range" is a range (allowable range) that does not result in deterioration of an image quality, which might cause a visible problem, even if displacement occurs from the ideal state in geometric optical aberration of the beam light (scanning light) for electrostatic latent image formation within that range. Also, in FIGS. 21 to 33, (a) "axial" means the center position of the main scanning range. The wording (b) "peripheral" means a position in the vicinity of a scan start position (or a scan end position) in the main scanning range.

In the following, the power in the main scanning direction of the image-forming optical device 140 in which the first scanning light lens 141 and the second scanning light lens 142 are combined is to be φtm. The power in the main scanning direction of the first scanning light lens 141 is to be φ1m. The power in the main scanning direction of the second scanning light lens 142 is to be φ2m. The power in the sub scanning direction of the first scanning light lens 141 is to be φ1s. The power in the sub scanning direction of the second scanning light lens 142 is to be φ2s.

An appropriate range of the power condition in the first main scanning direction will be described below.

The power condition in the first main scanning direction is a condition on how to set φ2m/φtm.

More specifically, the power condition d1M in the first main scanning direction in the execution conditions shown in FIG. 11 is φ2m/φtm=−0.75. Also, in FIGS. 12 to 14 and FIGS. 22 to 25, as the power conditions in the first main scanning direction other than the above, states in which (φ2m/φtm) is −1.22 (condition d1L'), −1.20 (condition d1L), −0.48 (condition d1H), and −0.50 (condition d1H') are shown.

As known from the graph shown in FIG. 13, when the power condition in the first main scanning direction is (φ2m/φtm<−1.20) or (φ2m/φtm>−0.48) (See the graph of the condition d1L' or the condition d1H'), the field curvature in the main scanning direction of the scanning light on the surface of the photoreceptor drum 101 exceeds the appropriate range (OK range) and becomes large. Also, as known from FIGS. 24 and 25, when the power condition in the first main scanning direction is (φ2m/φtm<−1.20) or (φ2m/φtm>−0.48) (See the graph of the condition d1L' or the condition d1H'), variation of spot positions of the scanning light on the surface of the photoreceptor drum 101 exceeds the appropriate range (OK range) and becomes large.

On the other hand, as known from the graphs shown in FIGS. 12 to 14 and 21 to 23, if the power condition in the first main scanning direction satisfies the following (a1) equation, the linearity of the scanning light on the surface of the photoreceptor drum 101, the field curvature in the main scanning direction and the field curvature in the sub scanning direction as well as the variation of the spot positions are all contained in the appropriate ranges.

$$-1.20 \leq \phi 2m/\phi tm \leq -0.48 \qquad (a1)$$

Subsequently, an appropriate range of the power condition in the second main scanning direction will be described below.

The power condition in the second main scanning direction is a condition on how to set φ1m/φtm.

More specifically, the power condition d2M in the second main scanning direction in the execution conditions shown in FIG. 11 is φ1m/φtm=1.65. Also, in FIGS. 15 to 17 and FIGS. 26 to 29, as the power conditions in the second main scanning direction other than the above, states in which (φ1m/φtm) is 1.30 (condition d2L'), 1.32 (condition d2L), 2.00 (condition d2H), and 2.02 (condition d2H') are shown.

As known from the graph shown in FIG. 15, when the power condition in the second main scanning direction is (φ1m/φtm>2.00) (See the graph of the condition d2H'), the linearity of the scanning light on the surface of the photoreceptor drum 101 exceeds the appropriate range (OK range) and becomes worse.

Also, as known from the graph shown in FIG. 16, if the power conditions in the second main scanning direction is (φ1m/φtm<1.32) (See the graph of the condition d2L'), the field curvature in the main scanning direction of the main scanning light on the surface of the photoreceptor drum 101 exceeds the appropriate range (OK range) and becomes large. Moreover, as known from FIG. 28, when the power condition in the second main scanning direction is (φ1m/φtm<1.32) (See the graph of the condition d2L'), variation of spot positions of the scanning light on the surface of the photoreceptor drum 101 exceeds the appropriate range (OK range) and becomes large.

On the other hand, as known from the graphs shown in FIGS. 15 to 17, FIG. 21, and FIGS. 26 to 29, if the power condition in the second main scanning direction satisfies the following (a2) equation, the linearity of the scanning light on the surface of the photoreceptor drum 101, the field curvature in the main scanning direction and the field curvature in the sub scanning direction, and the variation of the spot positions are all contained in the appropriate ranges.

$$1.32 \leq \phi 1m/\phi tm \leq 2.00 \qquad (a2)$$

Subsequently, an appropriate range of the power condition in the sub scanning direction will be described below.

The power condition in the sub scanning direction is a condition on how to set φ1s/φ2s.

More specifically, the power condition d3M in the sub scanning direction in the execution conditions shown in FIG. 11 is φ1s/φ2s=−2.52. Also, in FIGS. 18 to 20 and FIGS. 30 to 33, as the power conditions in the sub scanning direction other than the above, states in which (φ1s/φ2s) is −3.00 (condition d3L'), −2.98 (condition d3L), −0.81 (condition d3H), and −0.79 (condition d3H') are shown.

As known from the graph shown in FIG. 20, when the power condition in the sub scanning direction is (φ1s/φ2s<−2.98) or (φ1s/φ2s>−0.81) (See the graphs of the condition d3L' and the condition d3H'), the field curvature of the main scanning light in the sub scanning direction on the surface of the photoreceptor drum 101 exceeds the appropriate range (OK range) and becomes large.

Figure 32:
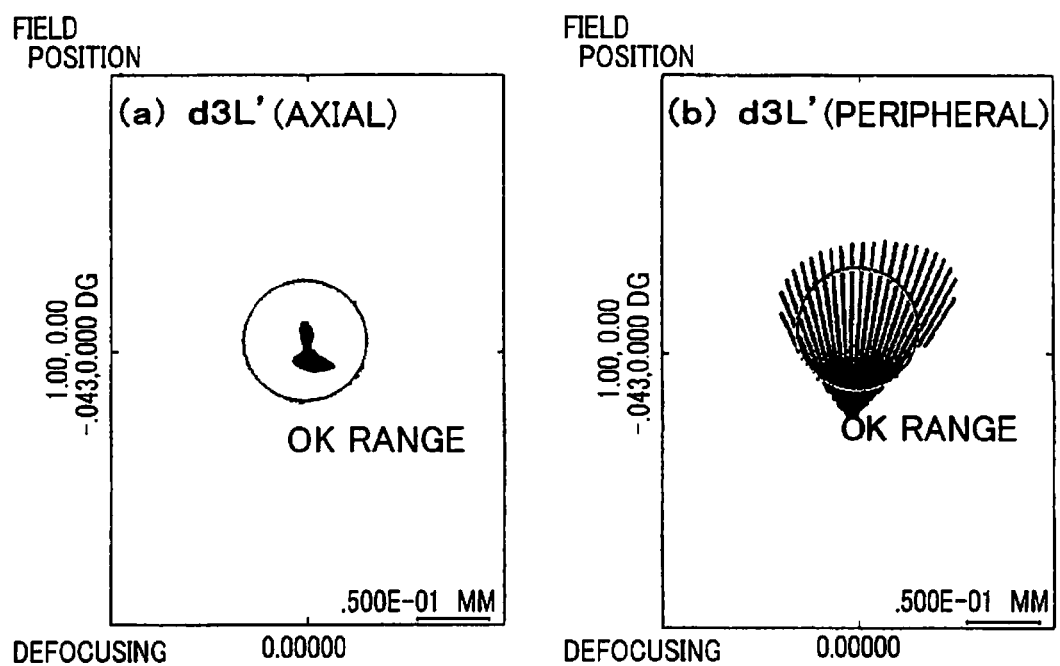
FIG. 32 are spot diagrams of the scanning light when the power condition in the sub scanning direction of the scanning light lens in the optical scanning apparatus Y is changed.
Figure 33:
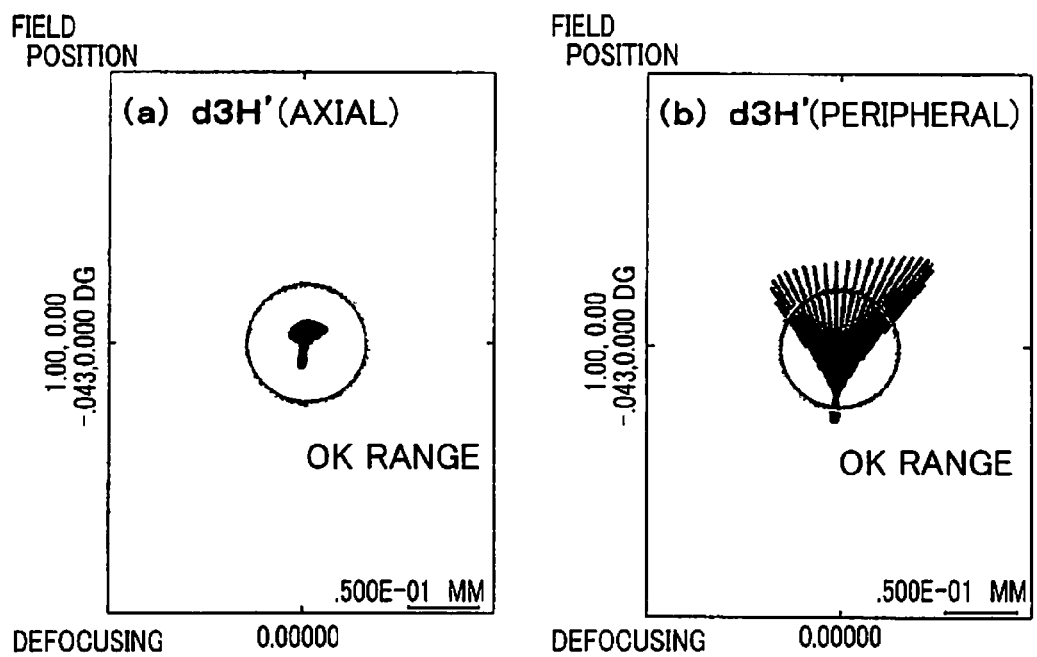
FIG. 33 are spot diagrams of the scanning light when the power condition in the sub scanning direction of the scanning light lens in the optical scanning apparatus Y is changed.

Moreover, as known from FIGS. 32 and 33, when the power condition in the sub scanning direction is (φ1s/φ2s<−2.98) or (φ1s/φ2s>−0.81) (See the graphs of the condition d3L' and the condition d3H'), variation of spot positions of the scanning light on the surface of the photoreceptor drum 101 exceeds the appropriate range (OK range) and becomes large.

On the other hand, as known from the graphs shown in FIGS. 18 to 20, FIG. 21 and FIGS. 30 to 33, if the power condition in the sub scanning direction satisfies the following (b1) equation, the linearity of the scanning light on the surface of the photoreceptor drum 101, the field curvature in the main scanning direction and the field curvature in the sub scanning direction, and the variation of the spot positions are all contained in the appropriate ranges.

$$-2.98 \leq \phi 1s/\phi 2s \leq -0.81 \qquad (b1)$$

Figure 31:
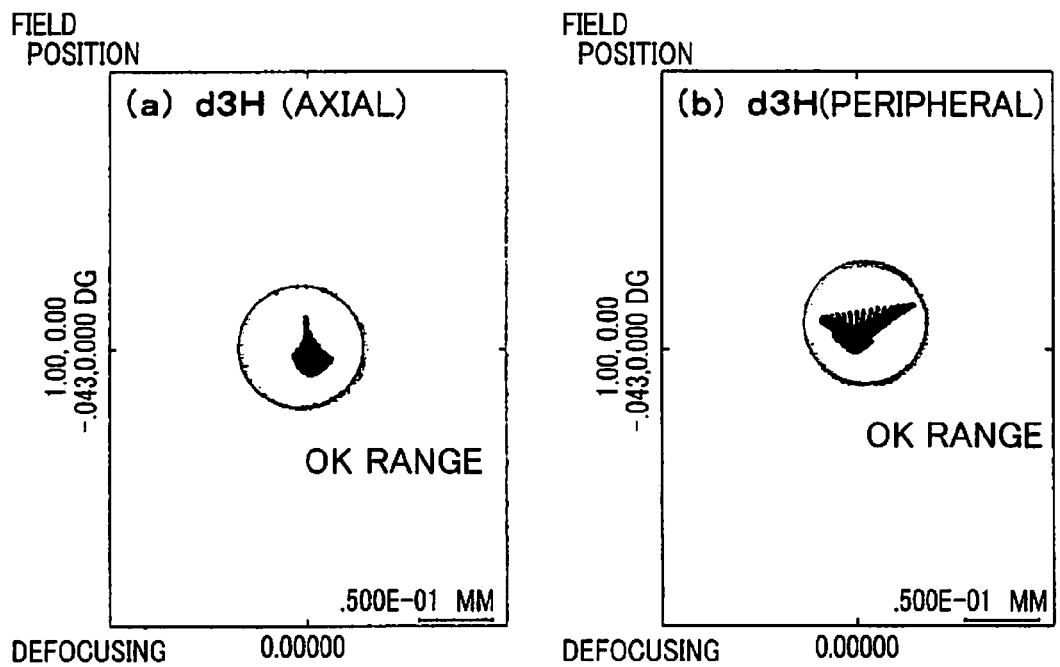
FIG. 31 are spot diagrams of the scanning light when the power condition in the sub scanning direction of the scanning light lens in the optical scanning apparatus Y is changed.

The large variation of the spot center positions in FIGS. 31 to 33 is caused by variation in aberration of the scanning light.

As described above, in the optical scanning apparatus Y, if the power in the main scanning direction of each of the first scanning light lens 141 and the second scanning light lens 142 satisfies either one of the conditions in the above-described (a1) equation or (a2) equation, the field curvature in the main scanning direction on the surface (the surface to be scanned) of the photoreceptor drum 101 and the variation in the scanning speed of the scanning light (linearity) can be kept small to such a degree that the image quality has a sufficient standard when an electrostatic latent image is written by the scanning light.

Similarly, if the power in the sub scanning direction of each of the first scanning light lens 141 and the second scanning light lens 142 satisfies the conditions of the above-described (b1) equation, the field curvature in the sub scanning direction on the surface of the photoreceptor drum 101 can be kept small to such a degree that the image quality has a sufficient standard when an electrostatic latent image is written by the scanning light.

Subsequently, an action of the diffraction optical element 124 will be described.

As for the light source 110 such as semiconductor laser, an oscillation wavelength of emitted beam light is varied in accordance with the use condition. Also, as for the first scanning light lens 141 and the second scanning light lens 142, their refraction indexes are changed to an unignorable degree in accordance with a variation in an environmental temperature. Thus, the variation in the use condition of the optical scanning apparatus Y causes movement of a focus (out of focus) of the scanning light on the surface of the photoreceptor drum 101.

On the other hand, the diffraction optical element 124 arranged in the optical path of the beam light from the collimator lens 121 to the polygon mirror 130 can change the focal distance of the beam light having passed through the cylindrical lens 123 in a direction in which the movement of the focus (out of focus) of the scanning light caused by the change is cancelled if the variation in the oscillation wavelength of the beam light emitted from the light source 110 or the variation in the environmental temperature occurs. Particularly, the first scanning light lens 141 and the second scanning light lens 142 are lenses made of resin. Thus, as compared with a case of a lens made of glass, a change in the refraction index caused by the environmental temperature variation (that is, a movement amount of focus of the scanning light) is relatively large. As a result, a marked effect of focus correction can be obtained by the diffraction optical element 124.

Subsequently, a second embodiment of the present invention will be described.

Figure 35:
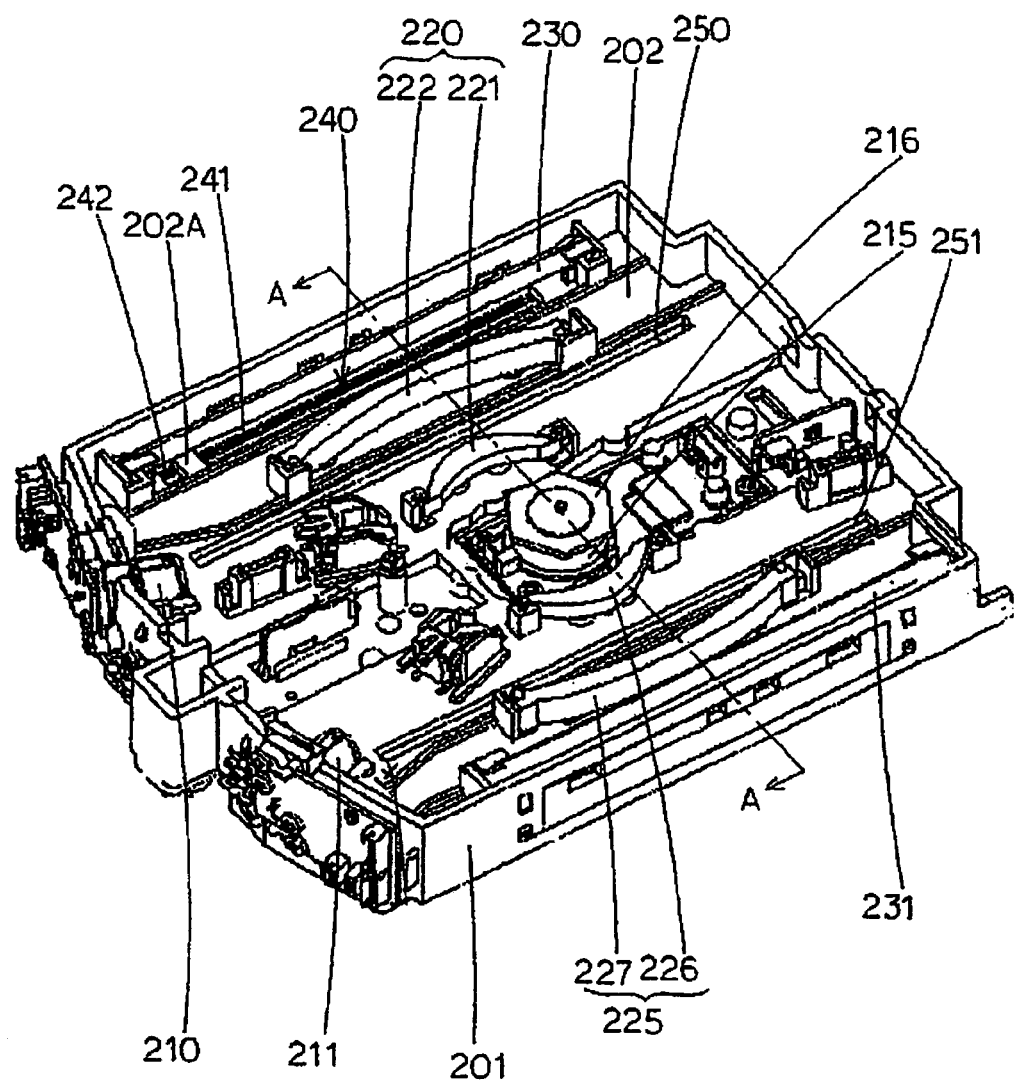
FIG. 35 is an appearance perspective view from one angle illustrating an upper side of a board in a state in which an upper cover of the optical scanning apparatus according to a second embodiment is removed.
Figure 36:
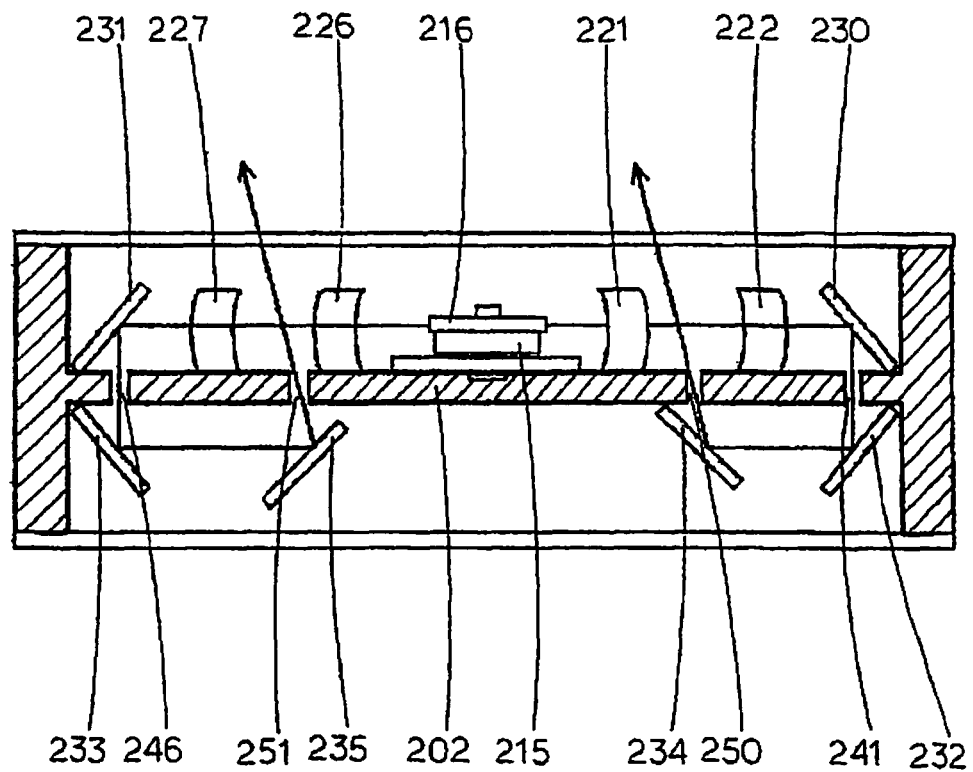
FIG. 36 is an outline enlarged sectional view in A-A line in FIG. 35.
Figure 37:
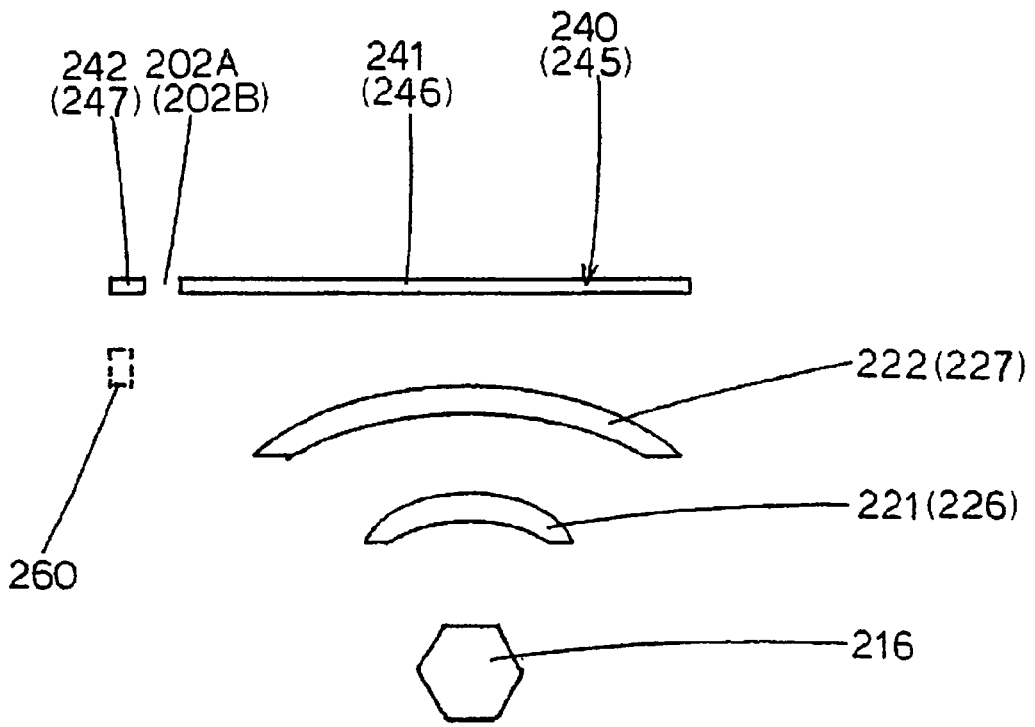
FIG. 37 is an outline plan explanatory diagram illustrating a characteristic part of the optical scanning apparatus according to the second embodiment.

The optical scanning apparatus shown in FIGS. 35 to 37 is mounted on a copier, a printer, a facsimile machine using electrophotography or a complex machine having those functions.

The optical scanning apparatus in the second embodiment performs scanning each light beam from two light sources (such as a semiconductor laser, for example) by dividing the light beam in symmetrical two directions by an optical deflector for deflection. In this optical scanning apparatus, a horizontal board 202 disposed inside a housing 201 is arranged such that a space inside the housing 201 is divided into two spaces on one surface side and an other surface side of the board 202. In the following explanation, the one surface side of the board 202 is referred to as an upper side and the other surface side as a lower side for convenience.

Two light sources 210 and 211 are attached in the vicinity of a side wall of the housing 201. Mounting angles of the light sources 210 and 211 are adjusted so that each emitted light beam from the two light sources 210 and 211 is directed to an optical deflector 215 attached to the board 202 substantially at the center inside the housing 201.

The light beams emitted from the light sources 210 and 211 contain image information in a part of them. In the following, a region containing the image information in the light beam is referred to as an image region. Also, in an image forming apparatus provided with this optical scanning apparatus, a part of the light beam in the region excluding the image region in the light beam deflected to be used scanning by the optical deflector 215 is detected by a scan start position detection sensor 260 (which will be described later) as a scan start position region detection portion, and a scan start position by the optical deflector 215 is set. A region of the light beam applicable to the above optical scan start position will be referred to as a scan start position detection region.

The optical deflector 215 has a regular hexagonal polygon mirror 216. The regular hexagonal polygon mirror 216 divides the light beams from the light sources 210 and 211 into symmetrical two directions as a light beam containing the light beam in the image region and the light beam in the scan start position detection region and deflects them in a predetermined angular range and performs scanning. This polygon mirror 216 is rotated and driven by a polygon motor (not shown).

In each optical path of the light beam deflected into the two directions and scanned, an fθ lens 220 composed of a first lens 221 and a second lens 222 and an fθ lens 225 composed of a first lens 226 and a second lens 227 are arranged. The first lenses 221 and 226 are located on the side of the optical deflector 215. The second lenses 222 and 227 are located on the side of first folding-back mirrors (optical system) 230 and 231, which will be described later.

The first folding-back mirrors 230 and 231 are arranged along the side walls of the housing 201 outside of the second lenses 222 and 227. The first folding-back mirrors 230 and 231 are to reflect the light beams having passed through the fθ lenses 220 and 225 to the lower side of the board 202. Thus, as shown in FIGS. 35 to 37, in the lower side of first folding-back mirrors 230 and 231, first scanning direction holes 240 and 245 are formed. The first scanning direction hole 240, a separation wall 202A (which will be described later), a lengthy portion 241 (which will be described later), and a short portion 242 (which will be described later) as well as the first scanning direction hole 245, a separation wall 202B (which will be described later), a lengthy portion 246 (which will be described later), and a short portion 247 (which will be described later) are different only in the point whether it is formed below the first folding-back mirror 230 or below the first folding-back mirror 231 and have the similar configurations. Thus, as shown in FIG. 37, the first scanning direction hole 245, the separation wall 202B (which will be described later), the lengthy portion 246 (which will be described later), and the short portion 247 (which will be described later) are shown in a common figure as having the configuration similar to the first scanning direction hole 240, the separation wall 202A (which will be described later), the lengthy portion 241 (which will be described later), and the short portion 242 (which will be described later).

As shown in FIGS. 35 to 37, the first scanning direction holes 240 and 245 are formed by being separated by the separation walls 202A and 202B, forming a part of the board 202. The portions separated by the separation walls 202A and 202B are the lengthy portions 241 and 246 through which the light beam in the image region in the light beam deflected by the optical deflector 215 to the predetermined angular range and performs scanning passes and the short portions 242 and 247 through which the light beam in the scan start position detection region passes. That is, the lengthy portion 241 and the short portion 242 as well as the lengthy portion 246 and the short portion 247 do not continue as one hole, respectively. Between the lengthy portion 241 and the short portion 242, the separation wall 202A integral with the board 202 is present. Between the lengthy portion 246 and the short portion 247, the separation wall 202B integral with the board 202 is present.

The light sources 210 and 211, the optical deflector 215, the fθ lenses 220 and 225, and the first folding-back mirrors 230 and 231 are arranged on the upper side of the board 202. However, on the lower side of the board 202, as shown in FIG. 36, on the lower sides of the lengthy portions 241 and 246 of the first scanning direction holes 240 and 245, second folding-back mirrors 232 and 233 are arranged. These second folding-back mirrors 232 and 233 are to reflect the light beams reflected by the first folding-back mirrors 230 and 231 to the lower side of the board 202 and having passed through the first scanning direction holes 240 and 245 to the direction parallel with the lower surface of the board 202.

Moreover, on the lower side of the board 202, third folding-back mirrors 234 and 235 are arranged. The third folding-back mirrors 234 and 235 reflect the light beam reflected by the second folding-back mirrors 232 and 233 toward a body to be scanned (such as a photoreceptor drum, for example, not shown) disposed on the upper side of the board 202. In accordance with that, in the board 202, second scanning direction holes 250 and 251 for transmitting the light beam to the upper side of the board 202 are formed on the upper side of the third folding-back mirrors 234 and 235. The angles of the third folding-back mirrors 234 and 235 are adjusted so that each of the light beams reflected by the third folding-back mirrors 234 and 235 passes through the second scanning direction holes 250 and 251 and travels in the same direction toward the body to be scanned.

Also, the light beam in the scan start position detection region having passed through the short portions 242 and 247 of the first scanning direction holes 240 and 245 is reflected by a mirror (not shown) for scan start position detection arranged on the lower side of the board 202 in order to divide the light beam to obtain a light beam directed to the scan start position. Then, the light beam reflected by the mirror for scan start position detection is received by a scan start position detection sensor 260 (See FIG. 37). On the basis of a light receiving signal by this sensor 260, rotation of the optical deflector 215 is controlled based on the scan start position. As a result, the positional displacement of the light beam in the image region passing through the lengthy portions 241 and 246 of the first scanning direction holes 240 and 245 is corrected.

In the optical scanning apparatus configured as above, with the purpose of reducing the size and thickness of the apparatus, the optical path of each light beam divided to be directed to two directions is folded back by the first folding-back mirror 230 and the second folding-back mirror 232 as well as the first folding-back mirror 231 and the second folding-back mirror 233 from the upper side of the board 202 to the lower side of the board 202, respectively. Moreover, the light beam is also folded back by each of the third folding-back mirrors 234 and 235, respectively, from the lower side of the board 202 to the upper side of the board 202. As a result, it is configured such that the optical path length is contained in a predetermined range.

However, by arranging the mirror for scan start position detection (not shown) on the upper side of the board 202, the optical path of the light beam in the scan start position detection region may be made to remain only on the front side of the board 202 without guiding it to the lower side of the board 202. However, if the size of the polygon mirror 216 is reduced, the optical path of the light beam in the image region and the optical path of the light beam in the scan start position detection region get closer to each other. Thus, in order to separate the optical path of the light beam in the image region and the optical path of the light beam in the scan start position detection region from each other, the mirror for scan start position detection cannot be installed without keeping some distance from the polygon mirror 216. Therefore, the mirror for scan start position detection is preferably arranged on the lower side of the board 202.

In this optical scanning apparatus, as described above, in the first scanning direction holes 240 and 245, the lengthy portions 241 and 246 through which the light beams in the image regions pass, and the short portions 242 and 247 through which the light beams in the scan start position detection region pass are separated by the separation walls 202A and 202B, which are a part of the housing 201, into two parts. This (See FIG. 37 illustrating only the first scanning direction hole 240) is the characteristic of the present invention.

Figure 38:
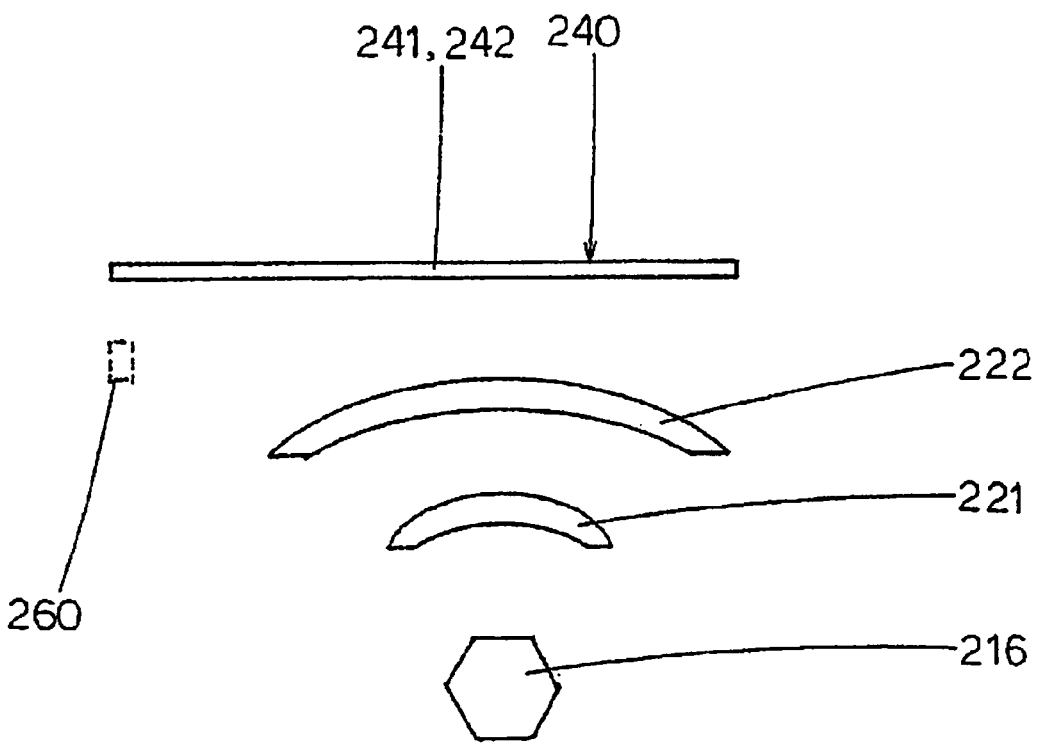
FIG. 38 is an outline plan explanatory diagram illustrating a characteristic part of an optical scanning apparatus according to a prior-art example.

That is, the optical scanning apparatus of the present invention has the separation wall 202A that separates the lengthy portion 241 and the short portion 242 from each other and the separation wall 202B that separates the lengthy portion 246 and the short portion 247 from each other. The separation walls 202A and 202B are integral with the housing 201 (a part of the housing). As a result, as compared with a case in which the lengthy portion 241 and the short portion 242 as well as the lengthy portion 246 and the short portion 247 are made single continuous holes, respectively, (See FIG. 38 illustrating only the first scanning direction hole 240), the strength of the board 202 is sufficiently ensured.

As described above, the strength of the board 202 can be sufficiently ensured. Thus, the board 202 becomes strong against deformation caused by an external force or an internal stress. And the board 202 becomes also strong against vibration caused by a vibration generating source such as a polygon motor. As a result, occurrence of a jitter image can be prevented. Therefore, the image quality can be improved.

Particularly, in this embodiment, the first folding-back mirror 230 as well as the second folding-back mirror 232 and the first scanning direction hole 240 are extremely close to each other. Also, this embodiment is configured such that the first folding-back mirror 231 as well as the second folding-back mirror 233 and the first scanning direction hole 245 are extremely close to each other. Thus, the first scanning direction holes 240 and 245 can easily affect the strength of support portions of the first holding-back mirrors 230 and 231 and the second folding-back mirrors 232 and 233. In this embodiment, between the lengthy portions 241 and 246 as well as the short portions 242 and 247 of the first scanning direction holes 240 and 245 are separated from each other by the separation walls 202A and 202B integral with the housing 201. Thus, the significance of the increase in the strength of the board 202 by the separation walls 202A and 202B is great.

In the second embodiment, the case in which the light source is located on the one surface side of the board (upper side in the embodiment) was described, but the present invention can be also applied to a case in which the light source is located on the other surface side of the board (lower side in the embodiment).

Also, the optical scanning apparatus provided with the above configuration can be used in the image forming apparatus.

Also, in the present invention, the image forming apparatus includes a copier, a printer, a facsimile machine using electrophotography or a complex machine having those functions.

What is claimed is:
1. An optical scanning apparatus, comprising:
a light source;
an optical deflector that reflects and deflects a light beam from the light source;
a lens installed in a reflection direction of the optical deflector and through which the light beam reflected by the optical deflector passes;

a reflective mirror group which is installed in accordance with the light source and guides the light beam having passed through the lens; and an image bearing member on which the light beam having been emitted from the light source and having passed through the reflective mirror group forms an image, wherein the reflective mirror group comprises a third reflective mirror that reflects the light beam having passed through the lens toward the image bearing member, the third reflective mirror and the image bearing member are arranged opposing each other across an optical path reflected by the optical deflector and passing through the lens, the lens comprises a set of two fθ lenses differing in an optical property from each other, and the set of two fθ lenses and the third reflective mirror are disposed such that the light beam having been reflected by the optical deflector and passing in series the set of two fθ lenses is reflected by the third reflective mirror and passes a space between the set of two fθ lenses.

2. The optical scanning apparatus according to claim 1, wherein the reflective mirror group is provided with a second reflective mirror that reflects the light beam to the third reflective mirror and a first reflective mirror that reflects the light reflected by the optical deflector toward the second reflective mirror; and reflection angles of the first reflective mirror and the second reflective mirror are both 90 degrees.

3. An image forming apparatus, including the optical scanning apparatus according to claim 1.

4. The optical scanning apparatus according to claim 1, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the first fθ lens in a main scanning direction to a power of a combination of the first fθ lens and the second fθ lens in the main scanning direction is equal to or greater than 1.32 and less than or equal to 2.00.

5. The optical scanning apparatus according to claim 1, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the second fθ lens in a main scanning direction to a power of a combination of the first fθ lens and the second fθ lens in the main scanning direction is equal to or greater than −1.20 and less than or equal to −0.48.

6. The optical scanning apparatus according to claim 1, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the first fθ lens in a second scanning direction to a power of the second fθ lens in the second scanning direction is equal to or greater than −2.98 and less than or equal to −0.81.

7. The optical scanning apparatus according to claim 1, wherein the set of two fθ lenses comprises a first fθ lens and a second fθ lens configured to be spaced away from each other on an optical axis and the first fθ lens is arranged to be more remote than the second fθ lens from the image bearing member, and wherein a distance from a reflective surface of the optical deflector to a surface facing the image baring member of the second fθ lens is less than one half of a distance from the reflective surface of the optical deflector to a surface of the image bearing member.

8. An optical scanning apparatus, comprising:

a plurality of light sources;

an optical deflector that reflects and deflects light beams from the plurality of light sources in two symmetrical directions;

a lens installed in a reflection direction of the optical deflector and through which the light beam reflected by the optical deflector passes;

a reflective mirror group which is installed in accordance with each of the light sources and guides the light beam having passed through the lens; and a plurality of image bearing members on which the light beams having been emitted from the plurality of light sources and having passed through the reflective mirror group form images, wherein the reflective mirror group comprises a third reflective mirror that reflects the light beam having passed through the lens toward the image bearing member, the third reflective mirror and the image bearing member are arranged opposing each other across an optical path reflected by the optical deflector and passing through the lens, the lens comprises a set of two fθ lenses differing in an optical property from each other, and the set of two fθ lenses and the third reflective mirror are disposed such that the light beam having been reflected by the optical deflector and passing in series the set of two fθ lenses is reflected by the third reflective mirror and passes a space between the set of two fθ lenses.

9. The optical scanning apparatus according to claim 8, wherein the reflective mirror group is provided with a second reflective mirror that reflects the light beam to the third reflective mirror and a first reflective mirror that reflects the light reflected by the optical deflector toward the second reflective mirror; and reflection angles of the first reflective mirror and the second reflective mirror are both 90 degrees.

10. An image forming apparatus, including the optical scanning apparatus according to claim 8.

11. The optical scanning apparatus according to claim 8, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the first fθ lens in a main scanning direction to a power of a combination of the first fθ lens and the second fθ lens in the main scanning direction is equal to or greater than 1.32 and less than or equal to 2.00.

12. The optical scanning apparatus according to claim 8, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the second fθ lens in a main scanning direction to a power of a combination of the first fθ lens and the second fθ lens in the main scanning direction is equal to or greater than −1.20 and less than or equal to −0.48.

13. The optical scanning apparatus according to claim 8, wherein the set of two fθ lenses comprises a first fθ lens and a second fθ lens configured to be spaced away from each other on an optical axis and the first fθ lens is arranged to be more remote than the second fθ lens from the image bearing member, and wherein a ratio defined by a power of the first fθ lens in a second scanning direction to a power of the second fθ lens in the second scanning direction is equal to or greater than −2.98 and less than or equal to −0.81.

14. The optical scanning apparatus according to claim 8, wherein the set of two fθ lenses comprises a first fθ lens and a second fθ lens configured to be spaced away from each other on an optical axis and the first fθ lens is arranged to be more remote than the second fθ lens from the image bearing member, and wherein a distance from a reflective surface of the optical deflector to a surface facing the image baring member of the second fθ lens is less than one half of a distance from the reflective surface of the optical deflector to a surface of the image bearing member.

15. An optical scanning apparatus, comprising:
a board having a scanning direction hole;
a light source which is arranged on one surface side of the board and emits a light beam including image information;
an optical deflector which is disposed on the one surface side where the light source of the board is disposed and deflects a light beam from the light source in a predetermined angular range and performs scanning;
an optical system that guides the light beam deflected to be used for scanning by the optical deflector to an other surface side of the board through the scanning-direction hole; and
a scan start position region detection portion which is disposed on the other surface side of the board and detects a scan start position detection region by detecting a region excluding an image region, which is a region containing the image information in the light beam guided to the other surface side of the board through the scanning direction hole, wherein
a portion through which the light beam of the image region passes and a portion through which the light beam of the scan start position detection region passes are each formed in the scanning direction hole as an independent section separated by a separation wall forming a part of the board.

16. The optical scanning apparatus according to claim 15, wherein
an optical path of the light beam deflected to be used for scanning by the optical deflector is folded back from a face side on which the light source of the board is arranged to the side opposite to the surface side on which the light source is arranged through a portion which is a part of the scanning direction hole and through which the light beam of the image region passes and moreover, is folded back from the side opposite to the surface side on which the light source of the board is arranged to the surface side on which the light source is arranged.

17. An image forming apparatus, including the optical scanning apparatus according to claim 15.

* * * * *